United States Patent
Rong et al.

(10) Patent No.: US 10,568,142 B2
(45) Date of Patent: Feb. 18, 2020

(54) METHOD FOR UPLINK DATA TRANSMISSION, TERMINAL DEVICE AND NETWORK DEVICE

(71) Applicant: HUAWEI TECHNOLOGIES CO., LTD., Shenzhen, Guangdong (CN)

(72) Inventors: Lu Rong, Shanghai (CN); Yalin Liu, Shenzhen (CN)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 8 days.

(21) Appl. No.: 15/914,412

(22) Filed: Mar. 7, 2018

(65) Prior Publication Data

US 2018/0199381 A1 Jul. 12, 2018

Related U.S. Application Data

(63) Continuation of application No. PCT/CN2016/098131, filed on Sep. 5, 2016.

(30) Foreign Application Priority Data

Sep. 8, 2015 (CN) .......................... 2015 1 0567790

(51) Int. Cl.
*H04W 72/08* (2009.01)
*H04W 74/08* (2009.01)
(Continued)

(52) U.S. Cl.
CPC ... *H04W 74/0833* (2013.01); *H04W 72/0413* (2013.01); *H04W 72/02* (2013.01); *H04W 88/02* (2013.01)

(58) Field of Classification Search
CPC ............. H04W 74/0833; H04W 74/00; H04W 74/004; H04W 74/008;
(Continued)

(56) References Cited

U.S. PATENT DOCUMENTS

2008/0080472 A1 4/2008 Bertrand et al.
2010/0103889 A1* 4/2010 Kim .................... H04W 74/004
370/329
(Continued)

FOREIGN PATENT DOCUMENTS

CN 101855934 A 10/2010
CN 102158932 A 8/2011
(Continued)

OTHER PUBLICATIONS

IEEE 802.16m-08/003r1, Shkumbin Hamiti, Nokia, SDD editor, The Draft IEEE 802.16m System Description Document. IEEE 802.16 Broadband Wireless Access Working Group. Apr. 30, 2008, 30 pages.
(Continued)

*Primary Examiner* — Warner Wong
(74) *Attorney, Agent, or Firm* — Womble Bond Dickinson (US) LLP

(57) ABSTRACT

The present invention discloses an uplink data transmission method, a terminal device, and a network device. The method includes: sending, by a terminal device to a network device, information used to request a grant-free transmission resource; receiving, by the terminal device, resource indication information sent by the network device, where the resource indication information is used to indicate a grant-free transmission resource that is allocated by the network device to the terminal device according to the information used to request the grant-free transmission resource; and determining, by the terminal device according to the resource indication information, the transmission resource used for performing grant-free transmission. According to the uplink data transmission method, the terminal device, and the network device in embodiments of the present invention, contention-based uplink data transmission can be (Continued)

implemented, and data transmission efficiency of a system can be improved.

16 Claims, 6 Drawing Sheets

(51) Int. Cl.
*H04W 72/04* (2009.01)
*H04W 72/02* (2009.01)
*H04W 88/02* (2009.01)

(58) Field of Classification Search
CPC ....... H04W 74/08–0825; H04W 88/02; H04W 72/00; H04W 72/02; H04W 72/04; H04W 72/0413; H04W 72/0446; H04W 72/0453; H04W 72/0466
See application file for complete search history.

(56) References Cited

U.S. PATENT DOCUMENTS

| | | | | |
|---|---|---|---|---|
| 2011/0216700 A1* | 9/2011 | Moon | ............ | H04W 74/08 370/328 |
| 2011/0292895 A1* | 12/2011 | Wager | ............ | H04L 5/0007 370/329 |
| 2012/0236816 A1* | 9/2012 | Park | ............ | H04W 74/08 370/329 |
| 2012/0257576 A1* | 10/2012 | Jeong | ............ | H04W 74/0841 370/328 |
| 2013/0022012 A1* | 1/2013 | Lee | ............ | H04W 52/0216 370/329 |
| 2013/0034071 A1* | 2/2013 | Lee | ............ | H04W 74/0866 370/329 |
| 2014/0161068 A1 | 6/2014 | Vrzic et al. | | |
| 2014/0192767 A1 | 7/2014 | Au et al. | | |
| 2014/0293902 A1 | 10/2014 | Hegde | | |
| 2014/0321391 A1* | 10/2014 | Zhang | ............ | H04W 52/50 370/329 |
| 2016/0278127 A1* | 9/2016 | Sunell | ............ | H04W 74/0833 |
| 2016/0338112 A1* | 11/2016 | Lee | ............ | H04W 76/27 |
| 2017/0013610 A1* | 1/2017 | Lee | ............ | H04L 1/00 |
| 2017/0019930 A1* | 1/2017 | Lee | ............ | H04W 74/0833 |
| 2017/0164350 A1* | 6/2017 | Sun | ............ | H04L 5/0007 |
| 2017/0332412 A1* | 11/2017 | Wang | ............ | H04W 74/0833 |
| 2018/0139653 A1* | 5/2018 | Lee | ............ | H04W 28/0278 |

FOREIGN PATENT DOCUMENTS

| | | |
|---|---|---|
| CN | 104838713 A | 8/2015 |
| CN | 105722234 A | 6/2016 |
| WO | 2014135126 A1 | 9/2014 |
| WO | 2015016754 A1 | 2/2015 |

OTHER PUBLICATIONS

XP050977415 GP-150378 Samsung,"Discussions of Non-Orthogonal Multiple Access in CIoT",3GPP TSG GERAN #66 Vilnius, Lithuania, May 25-29, 2015,7 pages.

XP032691945 Hong Tang et al., "Design and Simulation of the Contention Based Random Access Procedure in TD-LTE Systems", 2013 3rd International Conference on Computer Science and Network Technology,5 pages.

Jinhui , "LTE: random access process (2) ",Reserved by Blog User 826313734,Dec. 18, 2014,http://blog.sina.com.cn/s/blog_6ef610440102vemc.html,with an English machine translation,total 5 pages.

Samsung Electronics,"pCR 45.820 NB M2M—Grant-Free Multiple Access for Uplink Transmission (Update of GPC150322)",3GPP TSG GERAN CIoT Ad-hoc#3 GPC150513,Kista, Sweden, Jun. 29-Jul. 2, 2015,total 13 pages.

* cited by examiner

METHOD FOR UPLINK DATA TRANSMISSION, TERMINAL DEVICE AND NETWORK DEVICE

CROSS-REFERENCE TO RELATED APPLICATIONS

This application is a continuation of International Patent Application No. PCT/CN2016/098131, filed on Sep. 5, 2016, which claims priority to a China patent application 201510567790.6, filed on Sep. 8, 2015. The disclosures of the aforementioned applications are hereby incorporated by reference in their entireties.

TECHNICAL FIELD

The present invention relates to the communications field, and in particular, to an uplink data transmission method, a terminal device, and a network device in the communications field.

BACKGROUND

As a wireless cellular network evolves continuously, a next generation mobile communications system not only supports conventional communication, but also supports machine to machine (machine to machine, "M2M" for short) communication, which is also referred to as machine type communication (machine type communication, "MTC" for short). As predicted, in 2020, there will be 50 billion to 100 billion MTC devices connected over a network. This greatly exceeds a current quantity of connections. M2M services are diverse in service types, and different types of M2M services have quite different network requirements. In general, there are several requirements as follows: (I) reliable latency-insensitive transmission; and (II) ultra-reliable and low-latency transmission.

To deal with vast MTC services in a future network and to ensure an ultra-reliable and low-latency service transmission, an uplink grant-free (Grant Free) transmission solution is proposed. The grant-free transmission may be understood as contention-based uplink service data transmission, and is essentially different from data transmission in a wireless local area network (wireless local area network, WLAN) and an existing random access procedure in a Long Term Evolution (LTE, Long Term Evolution) system. However, for grant-free transmission, there is no mechanism that allows a network device to obtain permission to use a grant-free transmission resource.

SUMMARY

Embodiments of the present invention provide an uplink data transmission method, a terminal device, and a network device, so as to grant a contention-based grant-free transmission resource and improve data transmission efficiency of a system.

According to a first aspect, an uplink data transmission method is provided, including:

sending, by a terminal device to a network device, information used to request a grant-free transmission resource;

receiving, by the terminal device, resource indication information sent by the network device, where the resource indication information is used to indicate a grant-free transmission resource that is allocated by the network device to the terminal device according to the information used to request the grant-free transmission resource; and determining, by the terminal device according to the resource indication information, the transmission resource used for performing grant-free transmission.

With reference to the first aspect, in a first possible implementation of the first aspect, the sending, by a terminal device to a network device, information used to request a grant-free transmission resource includes:

sending, by the terminal device, a first random access preamble sequence, to request the grant-free transmission resource from the network device, where the first random access preamble sequence belongs to a first random access preamble sequence group, the first random access preamble sequence group is used to request a grant-free transmission resource, and the first random access preamble sequence group includes at least one random access preamble sequence.

With reference to the first possible implementation of the first aspect, in a second possible implementation of the first aspect, before the sending, by the terminal device, a first random access preamble sequence, to request the grant-free transmission resource from the network device, the method further includes:

selecting, by the terminal device, the first random access preamble sequence of the first random access preamble sequence group from multiple random access preamble sequence groups, where the multiple random access preamble sequence groups include at least the first random access preamble sequence group and a second random access preamble sequence group, and the second random access preamble sequence group is used to request a granted transmission resource.

With reference to the first or the second possible implementation of the first aspect, in a third possible implementation of the first aspect, the first random access preamble sequence group includes M first random access preamble sequence subgroups, and the M first random access preamble sequence subgroups are obtained by dividing according to a transmission characteristic.

With reference to the first aspect, in a fourth possible implementation of the first aspect, the sending, by a terminal device to a network device, information used to request a grant-free transmission resource includes:

sending, by the terminal device, a random access preamble sequence on a first random access channel, to request the grant-free transmission resource from the network device, where the first random access channel belongs to a first random access channel group, the first random access channel group is used to request a grant-free transmission resource, and the first random access channel group includes at least one random access channel.

With reference to the fourth possible implementation of the first aspect, in a fifth possible implementation of the first aspect, before the sending, by the terminal device, a random access preamble sequence on a first random access channel, the method further includes:

selecting, by the terminal device, the first random access channel of the first random access channel group from multiple random access channel groups, where the multiple random access channel groups include at least the first random access channel group and a second random access channel group, and the second random access channel group is used to request a granted transmission resource.

With reference to the fourth or the fifth possible implementation of the first aspect, in a sixth possible implementation of the first aspect, the first random access channel group includes N random access channel subgroups, and the N random access channel subgroups are obtained by dividing according to a transmission characteristic.

With reference to the first aspect, in a seventh possible implementation of the first aspect, the sending, by a terminal device to a network device, information used to request a grant-free transmission resource includes:

sending, by the terminal device, a first random access preamble sequence on a first random access channel, to request the grant-free transmission resource from the network device, where a combination of the first random access channel and the first random access preamble sequence belongs to a first combination set, the first combination set is used to request a grant-free transmission resource, and the first combination set includes at least one combination of a random access channel and a random access preamble sequence.

With reference to the seventh possible implementation of the first aspect, in an eighth possible implementation of the first aspect, before the sending, by the terminal device, a first random access preamble sequence on a first random access channel, the method further includes:

selecting, by the terminal device, the combination of the first random access channel and the first random access preamble sequence from multiple combination sets, where the combination is in the first combination set, the multiple combination sets include at least the first combination set and a second combination set, and the second combination set is used to request a granted transmission resource.

With reference to the seventh or the eighth possible implementation of the first aspect, in a ninth possible implementation of the first aspect, the first combination set includes K combination subsets, and the K combination subsets are obtained by dividing according to a transmission characteristic.

With reference to the third, the sixth, or the ninth possible implementation of the first aspect, in a tenth possible implementation of the first aspect, the transmission characteristic includes one or more of a latency characteristic, a power consumption characteristic, or a transmission time interval (TTI) length characteristic.

With reference to the first aspect, in an eleventh possible implementation of the first aspect, the sending, by a terminal device to a network device, information used to request a grant-free transmission resource includes:

sending, by the terminal device to the network device by using radio resource control (RRC) signaling, resource request information used to request the grant-free transmission resource.

With reference to the first aspect, in a twelfth possible implementation of the first aspect, the sending, by a terminal device to a network device, information used to request a grant-free transmission resource includes:

sending, by the terminal device to the network device by using Media Access Control (MAC) signaling, resource request information used to request the grant-free transmission resource.

With reference to the eleventh or the twelfth possible implementation of the first aspect, in a thirteenth possible implementation of the first aspect, the resource request information includes transmission characteristic information, where the transmission characteristic information is used to indicate a transmission characteristic of the grant-free transmission resource of the terminal device.

With reference to the thirteenth possible implementation of the first aspect, in a fourteenth possible implementation of the first aspect, the transmission characteristic information includes at least one of latency characteristic information, power consumption characteristic information, or transmission time interval (TTI) characteristic information.

With reference to any one of the eleventh to the fourteenth possible implementations of the first aspect, in a fifteenth possible implementation of the first aspect, the resource request information includes a terminal device identifier.

With reference to any one of the first aspect or the first to the fifteenth possible implementations of the first aspect, in a sixteenth possible implementation of the first aspect, the resource indication information includes one or a combination of time domain location information, frequency domain location information, code domain location information, or pilot information used to indicate the grant-free transmission resource.

With reference to any one of the first aspect or the first to the sixteenth possible implementations of the first aspect, in a seventeenth possible implementation of the first aspect, the resource indication information includes one or a combination of an index of the grant-free transmission resource, an index of a time domain location of the grant-free transmission resource, an index of a frequency domain location of the grant-free transmission resource, an index of a code domain location of the grant-free transmission resource, or an index of a pilot of the grant-free transmission resource.

With reference to the sixteenth or the seventeenth possible implementation of the first aspect, in an eighteenth possible implementation of the first aspect, the frequency domain location includes a location of a sub-band occupied by the grant-free transmission resource in a frequency domain.

According to a second aspect, an uplink data transmission method is provided, including:

receiving, by a network device, information that is used to request a grant-free transmission resource and that is sent by a terminal device; and sending, by the network device, resource indication information to the terminal device, where the resource indication information is used to indicate a grant-free transmission resource that is allocated by the network device to the terminal device according to the information used to request the grant-free transmission resource.

With reference to the second aspect, in a first possible implementation of the second aspect, the receiving, by a network device, information that is used to request a grant-free transmission resource and that is sent by a terminal device includes:

receiving, by the network device, a first random access preamble sequence sent by the terminal device, where the first random access preamble sequence belongs to a first random access preamble sequence group, the first random access preamble sequence group is used to request a grant-free transmission resource, and the first random access preamble sequence group includes at least one random access preamble sequence.

With reference to the first possible implementation of the second aspect, in a second possible implementation of the second aspect, the first random access preamble sequence is a random access preamble sequence of the first random access preamble sequence group selected by the terminal device from multiple random access preamble sequence groups, where the multiple random access preamble sequence groups include at least the first random access preamble sequence group and a second random access preamble sequence group, and the second random access preamble sequence group is used to request a granted transmission resource.

With reference to the first or the second possible implementation of the second aspect, in a third possible implementation of the second aspect, the first random access preamble sequence group includes M first random access preamble sequence subgroups, and the M first random access preamble sequence subgroups are obtained by dividing according to a transmission characteristic.

With reference to the second aspect, in a fourth possible implementation of the second aspect, the receiving, by a network device, information that is used to request a grant-free transmission resource and that is sent by a terminal device includes:

receiving, by the network device, a random access preamble sequence sent by the terminal device on a first random access channel, where the first random access channel belongs to a first random access channel group, the first random access channel group is used to request a grant-free transmission resource, and the first random access channel group includes at least one random access channel.

With reference to the fourth possible implementation of the second aspect, in a fifth possible implementation of the second aspect, the first random access channel is a random access channel of the first random access channel group selected by the terminal device from multiple random access channel groups, where the multiple random access channel groups include at least the first random access channel group and a second random access channel group, and the second random access channel group is used to request a granted transmission resource.

With reference to the fourth or the fifth possible implementation of the second aspect, in a sixth possible implementation of the second aspect, the first random access channel group includes N random access channel subgroups, and the N random access channel subgroups are obtained by dividing according to a transmission characteristic.

With reference to the second aspect, in a seventh possible implementation of the second aspect, the receiving, by a network device, information that is used to request a grant-free transmission resource and that is sent by a terminal device includes:

receiving, by the network device, a first random access preamble sequence sent by the terminal device on a first random access channel, where a combination of the first random access channel and the first random access preamble sequence belongs to a first combination set, the first combination set is used to request a grant-free transmission resource, and the first combination set includes at least one combination of a random access channel and a random access preamble sequence.

With reference to the seventh possible implementation of the second aspect, in an eighth possible implementation of the second aspect, the combination of the first random access channel and the first random access preamble sequence is a combination of a random access channel and a random access preamble sequence in the first combination set that is selected by the terminal device from multiple combination sets, where the multiple combination sets include at least the first combination set and a second combination set, and the second combination set is used to request a granted transmission resource.

With reference to the seventh or the eighth possible implementation of the second aspect, in a ninth possible implementation of the second aspect, the first combination set includes K combination subsets, and the K combination subsets are obtained by dividing according to a transmission characteristic.

With reference to the third, the sixth, or the ninth possible implementation of the second aspect, in a tenth possible implementation of the second aspect, the transmission characteristic includes one or more of a latency characteristic, a power consumption characteristic, or a transmission time interval (TTI) length characteristic.

With reference to the second aspect, in an eleventh possible implementation of the second aspect, the receiving, by a network device, information that is used to request a grant-free transmission resource and that is sent by a terminal device includes:

receiving, by the network device, resource request information that is used to request the grant-free transmission resource and that is sent by the terminal device to the network device by using radio resource control (RRC) signaling.

With reference to the second aspect, in a twelfth possible implementation of the second aspect, the receiving, by a network device, information that is used to request a grant-free transmission resource and that is sent by a terminal device includes:

receiving, by the network device, resource request information that is used to request the grant-free transmission resource and that is sent by the terminal device to the network device by using Media Access Control (MAC) signaling.

With reference to the eleventh or the twelfth possible implementation of the second aspect, in a thirteenth possible implementation of the second aspect, the resource request information includes transmission characteristic information, where the transmission characteristic information is used to indicate a transmission characteristic of the grant-free transmission resource of the terminal device.

With reference to the thirteenth possible implementation of the second aspect, in a fourteenth possible implementation of the second aspect, the transmission characteristic information includes at least one of latency characteristic information, power consumption characteristic information, or transmission time interval (TTI) characteristic information.

With reference to any one of the eleventh to the fourteenth possible implementations of the second aspect, in a fifteenth possible implementation of the second aspect, the resource request information includes a terminal device identifier, and the method further includes:

allocating, by the network device, different grant-free transmission resources to different terminal devices according to the terminal device identifier.

With reference to any one of the second aspect or the first to the fifteenth possible implementations of the second aspect, in a sixteenth possible implementation of the second aspect, the resource indication information includes one or a combination of time domain location information, frequency domain location information, code domain location information, or pilot information used to indicate the grant-free transmission resource.

With reference to any one of the second aspect or the first to the sixteenth possible implementations of the second aspect, in a seventeenth possible implementation of the second aspect, the resource indication information includes one or a combination of an index of the grant-free transmission resource, an index of a time domain location of the grant-free transmission resource, an index of a frequency domain location of the grant-free transmission resource, an index of a code domain location of the grant-free transmission resource, or an index of a pilot of the grant-free transmission resource.

With reference to the sixteenth or the seventeenth possible implementation of the second aspect, in an eighteenth possible implementation of the second aspect, the frequency domain location includes a location of a sub-band occupied by the grant-free transmission resource in a frequency domain. According to a third aspect, a terminal device is provided, including:

a sending module, configured to send, to a network device, information used to request a grant-free transmission resource;

a receiving module, configured to receive resource indication information sent by the network device, where the resource indication information is used to indicate a grant-free transmission resource that is allocated by the network device to the terminal device according to the information that is used to request the grant-free transmission resource and that is sent by the sending module; and a determining module, configured to determine, according to the resource indication information received by the receiving module, the transmission resource used for performing grant-free transmission.

With reference to the third aspect, in a first possible implementation of the third aspect, the sending module is specifically configured to:

send a first random access preamble sequence, to request the grant-free transmission resource from the network device, where the first random access preamble sequence belongs to a first random access preamble sequence group, the first random access preamble sequence group is used to request a grant-free transmission resource, and the first random access preamble sequence group includes at least one random access preamble sequence.

With reference to the first possible implementation of the third aspect, in a second possible implementation of the third aspect, the terminal device further includes:

a selection module, configured to: before the sending module sends the first random access preamble sequence, to request the grant-free transmission resource from the network device, select the first random access preamble sequence of the first random access preamble sequence group from multiple random access preamble sequence groups, where the multiple random access preamble sequence groups include at least the first random access preamble sequence group and a second random access preamble sequence group, and the second random access preamble sequence group is used to request a granted transmission resource.

With reference to the first or the second possible implementation of the third aspect, in a third possible implementation of the third aspect, the first random access preamble sequence group includes M first random access preamble sequence subgroups, and the M first random access preamble sequence subgroups are obtained by dividing according to a transmission characteristic.

With reference to the third aspect, in a fourth possible implementation of the third aspect, the sending module is specifically configured to:

send a random access preamble sequence on a first random access channel, to request the grant-free transmission resource from the network device, where the first random access channel belongs to a first random access channel group, the first random access channel group is used to request a grant-free transmission resource, and the first random access channel group includes at least one random access channel.

With reference to the fourth possible implementation of the third aspect, in a fifth possible implementation of the third aspect, the terminal device further includes:

a selection module, configured to: before the sending module sends the random access preamble sequence on the first random access channel, select the first random access channel of the first random access channel group from multiple random access channel groups, where the multiple random access channel groups include at least the first random access channel group and a second random access channel group, and the second random access channel group is used to request a granted transmission resource.

With reference to the fourth or the fifth possible implementation of the third aspect, in a sixth possible implementation of the third aspect, the first random access channel group includes N random access channel subgroups, and the N random access channel subgroups are obtained by dividing according to a transmission characteristic.

With reference to the third aspect, in a seventh possible implementation of the third aspect, the sending module is specifically configured to:

send a first random access preamble sequence on a first random access channel, to request the grant-free transmission resource from the network device, where a combination of the first random access channel and the first random access preamble sequence belongs to a first combination set, the first combination set is used to request a grant-free transmission resource, and the first combination set includes at least one combination of a random access channel and a random access preamble sequence.

With reference to the seventh possible implementation of the third aspect, in an eighth possible implementation of the third aspect, the terminal device further includes:

a selection module, configured to: before the sending module sends the first random access preamble sequence on the first random access channel, select the combination of the first random access channel and the first random access preamble sequence from multiple combination sets, where the combination is in the first combination set, the multiple combination sets include at least the first combination set and a second combination set, and the second combination set is used to request a granted transmission resource.

With reference to the seventh or the eighth possible implementation of the third aspect, in a ninth possible implementation of the third aspect, the first combination set includes K combination subsets, and the K combination subsets are obtained by dividing according to a transmission characteristic.

With reference to the third, the sixth, or the ninth possible implementation of the third aspect, in a tenth possible implementation of the third aspect, the transmission characteristic includes one or more of a latency characteristic, a power consumption characteristic, or a transmission time interval (TTI) length characteristic.

With reference to the third aspect, in an eleventh possible implementation of the third aspect, the sending module is specifically configured to:

send, to the network device by using radio resource control (RRC) signaling, resource request information used to request the grant-free transmission resource.

With reference to the third aspect, in a twelfth possible implementation of the third aspect, the sending module is specifically configured to:

send, to the network device by using Media Access Control (MAC) signaling, resource request information used to request the grant-free transmission resource.

With reference to the eleventh or the twelfth possible implementation of the third aspect, in a thirteenth possible implementation of the third aspect, the resource request information includes transmission characteristic information, where the transmission characteristic information is used to indicate a transmission characteristic of the grant-free transmission resource of the terminal device.

With reference to the thirteenth possible implementation of the third aspect, in a fourteenth possible implementation of the third aspect, the transmission characteristic information includes at least one of latency characteristic information, power consumption characteristic information, or transmission time interval (TTI) characteristic information.

With reference to any one of the eleventh to the fourteenth possible implementations of the third aspect, in a fifteenth possible implementation of the third aspect, the resource request information includes a terminal device identifier.

With reference to any one of the third aspect or the first to the fifteenth possible implementations of the third aspect, in a sixteenth possible implementation of the third aspect, the resource indication information received by the receiving module includes one or a combination of time domain location information, frequency domain location information, code domain location information, or pilot information used to indicate the grant-free transmission resource.

With reference to any one of the third aspect or the first to the sixteenth possible implementations of the third aspect, in a seventeenth possible implementation of the third aspect, the resource indication information received by the receiving module includes one or a combination of an index of the grant-free transmission resource, an index of a time domain location of the grant-free transmission resource, an index of a frequency domain location of the grant-free transmission resource, an index of a code domain location of the grant-free transmission resource, or an index of a pilot of the grant-free transmission resource.

With reference to the sixteenth or the seventeenth possible implementation of the third aspect, in an eighteenth possible implementation of the third aspect, the frequency domain location includes a location of a sub-band occupied by the grant-free transmission resource in a frequency domain.

According to a fourth aspect, a network device is provided, including:

a receiving module, configured to receive information that is used to request a grant-free transmission resource and that is sent by a terminal device; and a sending module, configured to send resource indication information to the terminal device, where the resource indication information is used to indicate a grant-free transmission resource that is allocated by the network device to the terminal device according to the information that is used to request the grant-free transmission resource and that is received by the receiving module.

With reference to the fourth aspect, in a first possible implementation of the fourth aspect, the receiving module is specifically configured to:

receive a first random access preamble sequence sent by the terminal device, where the first random access preamble sequence belongs to a first random access preamble sequence group, the first random access preamble sequence group is used to request a grant-free transmission resource, and the first random access preamble sequence group includes at least one random access preamble sequence.

With reference to the first possible implementation of the fourth aspect, in a second possible implementation of the fourth aspect, the first random access preamble sequence is a random access preamble sequence of the first random access preamble sequence group selected by the terminal device from multiple random access preamble sequence groups, where the multiple random access preamble sequence groups include at least the first random access preamble sequence group and a second random access preamble sequence group, and the second random access preamble sequence group is used to request a granted transmission resource.

With reference to the first or the second possible implementation of the fourth aspect, in a third possible implementation of the fourth aspect, the first random access preamble sequence group includes M first random access preamble sequence subgroups, and the M first random access preamble sequence subgroups are obtained by dividing according to a transmission characteristic.

With reference to the fourth aspect, in a fourth possible implementation of the fourth aspect, the receiving module is specifically configured to:

receive a random access preamble sequence sent by the terminal device on a first random access channel, where the first random access channel belongs to a first random access channel group, the first random access channel group is used to request a grant-free transmission resource, and the first random access channel group includes at least one random access channel.

With reference to the fourth possible implementation of the fourth aspect, in a fifth possible implementation of the fourth aspect, the first random access channel is a random access channel of the first random access channel group selected by the terminal device from multiple random access channel groups, where the multiple random access channel groups include at least the first random access channel group and a second random access channel group, and the second random access channel group is used to request a granted transmission resource.

With reference to the fourth or the fifth possible implementation of the fourth aspect, in a sixth possible implementation of the fourth aspect, the first random access channel group includes N random access channel subgroups, and the N random access channel subgroups are obtained by dividing according to a transmission characteristic.

With reference to the fourth aspect, in a seventh possible implementation of the fourth aspect, the receiving module is specifically configured to:

receive a first random access preamble sequence sent by the terminal device on a first random access channel, where a combination of the first random access channel and the first random access preamble sequence belongs to a first combination set, the first combination set is used to request a grant-free transmission resource, and the first combination set includes at least one combination of a random access channel and a random access preamble sequence.

With reference to the seventh possible implementation of the fourth aspect, in an eighth possible implementation of the fourth aspect, the combination of the first random access channel and the first random access preamble sequence is a combination of a random access channel and a random access preamble sequence in the first combination set that is selected by the terminal device from multiple combination sets, where the multiple combination sets include at least the first combination set and a second combination set, and the second combination set is used to request a granted transmission resource.

With reference to the seventh or the eighth possible implementation of the fourth aspect, in a ninth possible implementation of the fourth aspect, the first combination set includes K combination subsets, and the K combination subsets are obtained by dividing according to a transmission characteristic.

With reference to the third, the sixth, or the ninth possible implementation of the fourth aspect, in a tenth possible implementation of the fourth aspect, the transmission characteristic includes one or more of a latency characteristic, a power consumption characteristic, or a transmission time interval (TTI) length characteristic.

With reference to the fourth aspect, in an eleventh possible implementation of the fourth aspect, the receiving module is specifically configured to:

receive resource request information that is used to request the grant-free transmission resource and that is sent by the terminal device to the network device by using radio resource control (RRC) signaling.

With reference to the fourth aspect, in a twelfth possible implementation of the fourth aspect, the receiving module is specifically configured to:

receive resource request information that is used to request the grant-free transmission resource and that is sent by the terminal device to the network device by using Media Access Control (MAC) signaling.

With reference to the eleventh or the twelfth possible implementation of the fourth aspect, in a thirteenth possible implementation of the fourth aspect, the resource request information includes transmission characteristic information, where the transmission characteristic information is used to indicate a transmission characteristic of the grant-free transmission resource of the terminal device.

With reference to the thirteenth possible implementation of the fourth aspect, in a fourteenth possible implementation of the fourth aspect, the transmission characteristic information includes at least one of latency characteristic information, power consumption characteristic information, or transmission time interval (TTI) characteristic information.

With reference to any one of the eleventh to the fourteenth possible implementations of the fourth aspect, in a fifteenth possible implementation of the fourth aspect, the resource request information includes a terminal device identifier, and the network device further includes:

a processing module, configured to allocate different grant-free transmission resources to different terminal devices according to the terminal device identifier.

With reference to any one of the fourth aspect or the first to the fifteenth possible implementations of the fourth aspect, in a sixteenth possible implementation of the fourth aspect, the resource indication information sent by the sending module includes one or a combination of time domain location information, frequency domain location information, code domain location information, or pilot information used to indicate the grant-free transmission resource.

With reference to any one of the fourth aspect or the first to the sixteenth possible implementations of the fourth aspect, in a seventeenth possible implementation of the fourth aspect, the resource indication information sent by the sending module includes one or a combination of an index of the grant-free transmission resource, an index of a time domain location of the grant-free transmission resource, an index of a frequency domain location of the grant-free transmission resource, an index of a code domain location of the grant-free transmission resource, or an index of a pilot of the grant-free transmission resource.

With reference to the sixteenth or the seventeenth possible implementation of the fourth aspect, in an eighteenth possible implementation of the fourth aspect, the frequency domain location includes a location of a sub-band occupied by the grant-free transmission resource in a frequency domain.

According to a fifth aspect, a terminal device is provided, including a processor, a memory, a transmitter, and a receiver, where the transmitter invokes a program stored in the memory, so as to send, to a network device, information used to request a grant-free transmission resource; the receiver invokes a program stored in the memory, so as to receive resource indication information sent by the network device, where the resource indication information is used to indicate a grant-free transmission resource that is allocated by the network device to the terminal device according to the information that is used to request the grant-free transmission resource and that is sent by the transmitter; and the processor invokes a program stored in the memory, so as to determine, according to the resource indication information received by the receiver, the transmission resource used for performing grant-free transmission.

With reference to the fifth aspect, in a first possible implementation of the fifth aspect, the transmitter is specifically configured to:

send a first random access preamble sequence, to request the grant-free transmission resource from the network device, where the first random access preamble sequence belongs to a first random access preamble sequence group, the first random access preamble sequence group is used to request a grant-free transmission resource, and the first random access preamble sequence group includes at least one random access preamble sequence.

With reference to the first possible implementation of the fifth aspect, in a second possible implementation of the fifth aspect, the processor is further configured to:

before the sending module sends the first random access preamble sequence, to request the grant-free transmission resource from the network device, select the first random access preamble sequence of the first random access preamble sequence group from multiple random access preamble sequence groups, where the multiple random access preamble sequence groups include at least the first random access preamble sequence group and a second random access preamble sequence group, and the second random access preamble sequence group is used to request a granted transmission resource.

With reference to the first or the second possible implementation of the fifth aspect, in a third possible implementation of the fifth aspect, the first random access preamble sequence group includes M first random access preamble sequence subgroups, and the M first random access preamble sequence subgroups are obtained by dividing according to a transmission characteristic.

With reference to the fifth aspect, in a fourth possible implementation of the fifth aspect, the transmitter is specifically configured to:

send a random access preamble sequence on a first random access channel, to request the grant-free transmission resource from the network device, where the first random access channel belongs to a first random access channel group, the first random access channel group is used to request a grant-free transmission resource, and the first random access channel group includes at least one random access channel.

With reference to the fourth possible implementation of the fifth aspect, in a fifth possible implementation of the fifth aspect, the processor is further configured to:

before the sending module sends the random access preamble sequence on the first random access channel, select the first random access channel of the first random access channel group from multiple random access channel groups, where the multiple random access channel groups include at least the first random access channel group and a second random access channel group, and the second random access channel group is used to request a granted transmission resource.

With reference to the fourth or the fifth possible implementation of the fifth aspect, in a sixth possible implementation of the fifth aspect, the first random access channel group includes N random access channel subgroups, and the N random access channel subgroups are obtained by dividing according to a transmission characteristic.

With reference to the fifth aspect, in a seventh possible implementation of the fifth aspect, the generator is specifically configured to:

send a first random access preamble sequence on a first random access channel, to request the grant-free transmission resource from the network device, where a combination of the first random access channel and the first random access preamble sequence belongs to a first combination set, the first combination set is used to request a grant-free transmission resource, and the first combination set includes at least one combination of a random access channel and a random access preamble sequence.

With reference to the seventh possible implementation of the fifth aspect, in an eighth possible implementation of the fifth aspect, the processor is further configured to:

before the sending module sends the first random access preamble sequence on the first random access channel, select the combination of the first random access channel and the first random access preamble sequence from multiple combination sets, where the combination is in the first combination set, the multiple combination sets include at least the first combination set and a second combination set, and the second combination set is used to request a granted transmission resource.

With reference to the seventh or the eighth possible implementation of the fifth aspect, in a ninth possible implementation of the fifth aspect, the first combination set includes K combination subsets, and the K combination subsets are obtained by dividing according to a transmission characteristic.

With reference to the third, the sixth, or the ninth possible implementation of the fifth aspect, in a tenth possible implementation of the fifth aspect, the transmission characteristic includes one or more of a latency characteristic, a power consumption characteristic, or a transmission time interval (TTI) length characteristic.

With reference to the fifth aspect, in an eleventh possible implementation of the fifth aspect, the transmitter is specifically configured to:

send, to the network device by using radio resource control (RRC) signaling, resource request information used to request the grant-free transmission resource.

With reference to the fifth aspect, in a twelfth possible implementation of the fifth aspect, the transmitter is specifically configured to:

send, to the network device by using Media Access Control (MAC) signaling, resource request information used to request the grant-free transmission resource.

With reference to the eleventh or the twelfth possible implementation of the fifth aspect, in a thirteenth possible implementation of the fifth aspect, the resource request information includes transmission characteristic information, where the transmission characteristic information is used to indicate a transmission characteristic of the grant-free transmission resource of the terminal device.

With reference to the thirteenth possible implementation of the fifth aspect, in a fourteenth possible implementation of the fifth aspect, the transmission characteristic information includes at least one of latency characteristic information, power consumption characteristic information, or transmission time interval (TTI) characteristic information.

With reference to any one of the eleventh to the fourteenth possible implementations of the fifth aspect, in a fifteenth possible implementation of the fifth aspect, the resource request information includes a terminal device identifier.

With reference to any one of the fifth aspect or the first to the fifteenth possible implementations of the fifth aspect, in a sixteenth possible implementation of the fifth aspect, the resource indication information received by the receiver includes one or a combination of time domain location information, frequency domain location information, code domain location information, or pilot information used to indicate the grant-free transmission resource.

With reference to any one of the fifth aspect or the first to the sixteenth possible implementations of the fifth aspect, in a seventeenth possible implementation of the fifth aspect, the resource indication information received by the receiver includes one or a combination of an index of the grant-free transmission resource, an index of a time domain location of the grant-free transmission resource, an index of a frequency domain location of the grant-free transmission resource, an index of a code domain location of the grant-free transmission resource, or an index of a pilot of the grant-free transmission resource.

With reference to the sixteenth or the seventeenth possible implementation of the fifth aspect, in an eighteenth possible implementation of the fifth aspect, the frequency domain location includes a location of a sub-band occupied by the grant-free transmission resource in a frequency domain.

According to a sixth aspect, a network device is provided, including a transmitter and a receiver, where the receiver is configured to receive information that is used to request a grant-free transmission resource and that is sent by a terminal device; the transmitter is configured to send resource indication information to the terminal device, where the resource indication information is used to indicate a grant-free transmission resource that is allocated by the network device to the terminal device according to the information that is used to request the grant-free transmission resource and that is received by the receiver.

With reference to the sixth aspect, in a first possible implementation of the sixth aspect, the receiver is specifically configured to:

receive a first random access preamble sequence sent by the terminal device, where the first random access preamble sequence belongs to a first random access preamble sequence group, the first random access preamble sequence group is used to request a grant-free transmission resource, and the first random access preamble sequence group includes at least one random access preamble sequence.

With reference to the first possible implementation of the sixth aspect, in a second possible implementation of the sixth aspect, the first random access preamble sequence is a random access preamble sequence of the first random access preamble sequence group selected by the terminal device from multiple random access preamble sequence groups, where the multiple random access preamble sequence groups include at least the first random access preamble sequence group and a second random access preamble sequence group, and the second random access preamble sequence group is used to request a granted transmission resource.

With reference to the first or the second possible implementation of the sixth aspect, in a third possible implementation of the sixth aspect, the first random access preamble sequence group includes M first random access preamble sequence subgroups, and the M first random access preamble sequence subgroups are obtained by dividing according to a transmission characteristic.

With reference to the sixth aspect, in a fourth possible implementation of the sixth aspect, the receiver is specifically configured to:

receive a random access preamble sequence sent by the terminal device on a first random access channel, where the first random access channel belongs to a first random access channel group, the first random access channel group is used to request a grant-free transmission resource, and the first random access channel group includes at least one random access channel.

With reference to the fourth possible implementation of the sixth aspect, in a fifth possible implementation of the sixth aspect, the first random access channel is a random access channel of the first random access channel group selected by the terminal device from multiple random access channel groups, where the multiple random access channel groups include at least the first random access channel group and a second random access channel group, and the second random access channel group is used to request a granted transmission resource.

With reference to the fourth or the fifth possible implementation of the sixth aspect, in a sixth possible implementation of the sixth aspect, the first random access channel group includes N random access channel subgroups, and the N random access channel subgroups are obtained by dividing according to a transmission characteristic.

With reference to the sixth aspect, in a seventh possible implementation of the sixth aspect, the receiver is specifically configured to:

receive a first random access preamble sequence sent by the terminal device on a first random access channel, where a combination of the first random access channel and the first random access preamble sequence belongs to a first combination set, the first combination set is used to request a grant-free transmission resource, and the first combination set includes at least one combination of a random access channel and a random access preamble sequence.

With reference to the seventh possible implementation of the sixth aspect, in an eighth possible implementation of the sixth aspect, the combination of the first random access channel and the first random access preamble sequence is a combination of a random access channel and a random access preamble sequence in the first combination set that is selected by the terminal device from multiple combination sets, where the multiple combination sets include at least the first combination set and a second combination set, and the second combination set is used to request a granted transmission resource.

With reference to the seventh or the eighth possible implementation of the sixth aspect, in a ninth possible implementation of the sixth aspect, the first combination set includes K combination subsets, and the K combination subsets are obtained by dividing according to a transmission characteristic.

With reference to the third, the sixth, or the ninth possible implementation of the sixth aspect, in a tenth possible implementation of the sixth aspect, the transmission characteristic includes one or more of a latency characteristic, a power consumption characteristic, or a transmission time interval (TTI) length characteristic.

With reference to the sixth aspect, in an eleventh possible implementation of the sixth aspect, the receiver is specifically configured to:

receive resource request information that is used to request the grant-free transmission resource and that is sent by the terminal device to the network device by using radio resource control (RRC) signaling.

With reference to the sixth aspect, in a twelfth possible implementation of the sixth aspect, the receiver is specifically configured to:

receive resource request information that is used to request the grant-free transmission resource and that is sent by the terminal device to the network device by using Media Access Control (MAC) signaling.

With reference to the eleventh or the twelfth possible implementation of the sixth aspect, in a thirteenth possible implementation of the sixth aspect, the resource request information includes transmission characteristic information, where the transmission characteristic information is used to indicate a transmission characteristic of the grant-free transmission resource of the terminal device.

With reference to the thirteenth possible implementation of the sixth aspect, in a fourteenth possible implementation of the sixth aspect, the transmission characteristic information includes at least one of latency characteristic information, power consumption characteristic information, or transmission time interval (TTI) characteristic information.

With reference to any one of the eleventh to the fourteenth possible implementations of the sixth aspect, in a fifteenth possible implementation of the sixth aspect, the resource request information includes a terminal device identifier, and the network device further includes a processor, where the processor is configured to:

allocate different grant-free transmission resources to different terminal devices according to the terminal device identifier.

With reference to any one of the sixth aspect or the first to the fifteenth possible implementations of the sixth aspect, in a sixteenth possible implementation of the sixth aspect, the resource indication information sent by the transmitter includes one or a combination of time domain location information, frequency domain location information, code domain location information, or pilot information used to indicate the grant-free transmission resource.

With reference to any one of the sixth aspect or the first to the sixteenth possible implementations of the sixth aspect, in a seventeenth possible implementation of the sixth aspect, the resource indication information sent by the transmitter includes one or a combination of an index of the grant-free transmission resource, an index of a time domain location of the grant-free transmission resource, an index of a frequency domain location of the grant-free transmission resource, an index of a code domain location of the grant-free transmission resource, or an index of a pilot of the grant-free transmission resource.

With reference to the sixteenth or the seventeenth possible implementation of the sixth aspect, in an eighteenth possible implementation of the sixth aspect, the frequency domain location includes a location of a sub-band occupied by the grant-free transmission resource in a frequency domain.

Based on the foregoing technical solutions, according to the uplink data transmission method, the terminal device, and the network device that are provided in the embodiments of the present invention, the terminal device sends, to the network device, the information used to request the grant-free transmission resource, and receives the resource indication information sent by the network device. The terminal device can perform uplink data transmission on the grant-free transmission resource allocated by the network device to the terminal device. This implements contention-based uplink data transmission and improves data transmission efficiency of the system.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
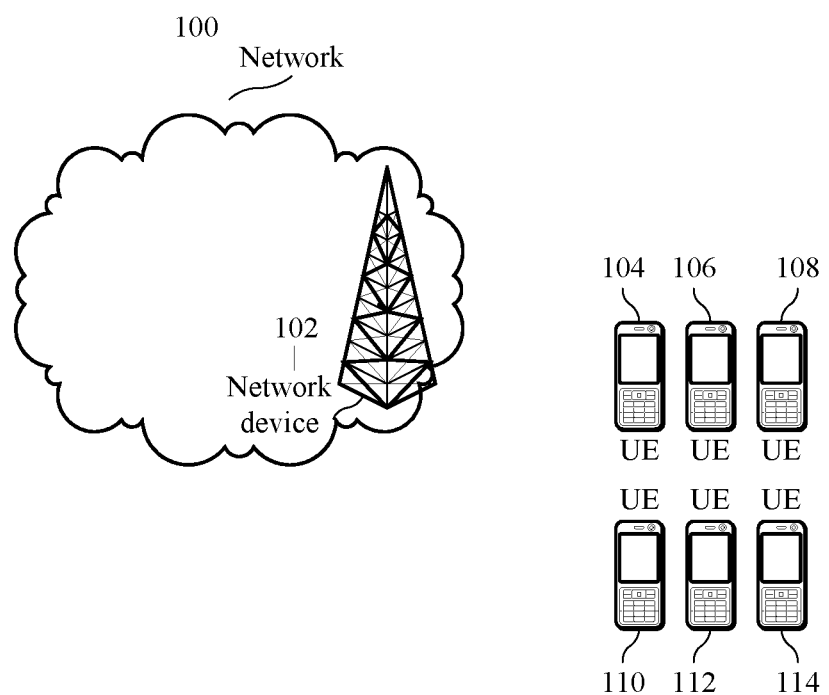
FIG. 1 is a schematic architecture diagram of a communications system to which an embodiment of the present invention is applied.

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from one components interacting with another component in a local system, a distributed system, and/or across a network such as the Internet interacting with other systems by using the signal).

It should be understood that the technical solutions in the embodiments of the present invention may be applied to various communications systems, such as: a Global System for Mobile Communications (Global System for Mobile Communication, "GSM" for short) system, a Code Division Multiple Access (Code Division Multiple Access, "CDMA" for short) system, a Wideband Code Division Multiple Access (Wideband Code Division Multiple Access, "WCDMA" for short) system, a general packet radio service (General Packet Radio Service, "GPRS" for short) system, a Long Term Evolution (Long Term Evolution, "LTE" for short) system, an LTE frequency division duplex (Frequency Division Duplex, "FDD" for short) system, an LTE time division duplex (Time Division Duplex, "TDD" for short) system, a Universal Mobile Telecommunications System (Universal Mobile Telecommunications System, "UMTS" for short), a Worldwide Interoperability for Microwave Access (Worldwide Interoperability for Microwave Access, "WiMAX" for short) communications system, and a future 5G communications system.

It should be further understood that the technical solutions in the embodiments of the present invention may also be applied to various communications systems based on a non-orthogonal multiple access technology, such as a sparse code multiple access (Sparse Code Multiple Access, "SCMA" for short) system. Certainly, SCMA may have another name in the communications field. Further, the technical solutions in the embodiments of the present invention may be applied to a multi-carrier transmission system using the non-orthogonal multiple access technology, such as an orthogonal frequency division multiplexing (Orthogonal Frequency Division Multiplexing, "01-DM" for short) system, a filter bank multicarrier (Filter Bank MultiCarrier, "FBMC" for short) system, a generalized frequency division multiplexing (Generalized Frequency Division Multiplexing, "GFDM" for short) system, and a filtered orthogonal frequency division multiplexing (Filtered-OFDM, "F-OFDM" for short) system that use the non-orthogonal multiple access technology.

The present invention describes the embodiments with reference to a terminal device. The terminal device may communicate with one or more core networks by using a radio access network (Radio Access Network, RAN). The terminal device may be user equipment (User Equipment, "UE" for short), an access terminal, a subscriber unit, a subscriber station, a mobile station, a remote station, a remote terminal, a mobile device, a user terminal, a terminal, a wireless communications device, a user agent, or a user apparatus. The access terminal may be a cellular phone, a cordless phone, a Session Initiation Protocol (Session Initiation Protocol, "SIP" for short) phone, a wireless local loop (Wireless Local Loop, "WLL" for short) station, a personal digital assistant (Personal Digital Assistant, "PDA" for short), a handheld device having a wireless communication function, a computing device, another processing device connected to a wireless modem, an in-vehicle device, a wearable device, a terminal device in a future 5G network, or the like.

The present invention describes the embodiments with reference to a network device. The network device may be a device configured to communicate with a terminal device. For example, the network device may be a base transceiver station (Base Transceiver Station, "BTS" for short) in a GSM system or a CDMA system, a NodeB (NodeB, "NB" for short) in a WCDMA system, or an evolved NodeB (Evolved Node B, "eNB" or "eNodeB" for short) in an LTE system. Alternatively, the network device may be a relay node, an access point, an in-vehicle device, a wearable device, a network side device in a future 5G network, a network device in a future evolved Public Land Mobile Network (PLMN) network, or the like.

In addition, aspects or features of the present invention may be implemented as a method, an apparatus, or a product that uses standard programming and/or engineering technologies. The term "product" used in this application covers a computer program that can be accessed from any computer readable component, carrier, or medium. For example, the computer-readable medium may include but is not limited to: a magnetic storage component (for example, a hard disk, a floppy disk, or a magnetic tape), an optical disc (for example, a CD (Compact Disc, compact disc), a DVD (Digital Versatile Disc, digital versatile disc), a smart card and a flash memory component (for example, an EPROM (Erasable Programmable Read-Only Memory, erasable programmable read-only memory), a card, a stick, or a key drive). In addition, various storage media described in this specification may indicate one or more devices and/or other machine-readable media that are used to store information. The term "machine readable media" may include but is not limited to a radio channel, and various other media that can store, contain, and/or carry an instruction and/or data.

A next-generation mobile communications system not only supports conventional communication, but also supports machine to machine (Machine to Machine, "M2M" for short) communication, which is also referred to as machine type communication (Machine Type Communication, "MTC" for short). As predicted, in 2020, there will be 50 billion to 100 billion MTC devices connected over a network. This greatly exceeds a current quantity of connections. M2M services are diverse in service types, and different types of M2M services have quite different network requirements. In general, there are several requirements as follows: (I) reliable latency-insensitive transmission; and (II) ultra-reliable and low-latency transmission.

A service requiring reliable latency-insensitive transmission is relatively easy to deal with. However, a service requiring ultra-reliable and low-latency transmission, such as a V2V (Vehicle to Vehicle) service, not only requires a low transmission latency but also requires reliable transmission. If transmission is unreliable, retransmission is caused. As a result, a transmission latency is excessively high, and requirements cannot be met.

Due to the existence of a large quantity of connections, there is a significant difference between a future wireless communications system and an existing communications system. Because of the large quantity of connections, more resources need to be consumed for terminal device access, and more resources need to be consumed for scheduling signaling transmission that is related to data transmission by a terminal device.

FIG. 1 is a schematic architecture diagram of a communications system to which an embodiment of the present invention is applied. As shown in FIG. 1, the communications system 100 may include a network device 102 and terminal devices 104 to 114 (referred to as UE for short in the figure). The network device 102 and the terminal devices 104 to 114 are connected in a wireless manner, a wired manner, or another manner.

A network in this embodiment of the present invention may be a public land mobile network (Public Land Mobile Network, "PLMN" for short), a D2D network, an M2M network, or another network. FIG. 1 is merely an example of a simplified schematic diagram. The network may further include another network device, which is not shown in FIG. 1.

To deal with vast MTC services in a future network and satisfy ultra-reliable and low-latency transmission, the present invention proposes an uplink grant-free (Grant Free) transmission solution. Grant-free transmission herein may be specific to uplink data transmission. The grant-free transmission may be understood as any one or more of the following meanings, or a combination of some technical features in multiple meanings or another similar meaning.

1. Grant-free transmission may mean: A network device pre-allocates multiple transmission resources to a terminal device and notifies the terminal device of the multiple transmission resources; when the terminal device has an uplink data transmission requirement, the terminal device selects at least one transmission resource from the multiple transmission resources pre-allocated by the network device, and sends uplink data by using the selected transmission resource; the network device detects, on one or more of the multiple pre-allocated transmission resources, the uplink data sent by the terminal device. The detection may be blind detection, detection performed according to a control field in the uplink data, or detection performed in another manner.

2. Grant-free transmission may mean: A network device pre-allocates multiple transmission resources to a terminal device and notifies the terminal device of the multiple transmission resources, so that when the terminal device has an uplink data transmission requirement, the terminal device selects at least one transmission resource from the multiple transmission resources pre-allocated by the network device, and sends uplink data by using the selected transmission resource.

3. Grant-free transmission may mean: Information about multiple pre-allocated transmission resources is obtained; when there is an uplink data transmission requirement, at least one transmission resource is selected from the multiple transmission resources, and uplink data is sent by using the selected transmission resource. An obtaining manner may be obtaining the information about multiple pre-allocated transmission resources from a network device.

4. Grant-free transmission may mean: an uplink data transmission method of a terminal device that can be implemented without dynamic scheduling by a network device. The dynamic scheduling may be a scheduling manner in which the network device indicates, by using signaling, a transmission resource for each uplink data transmission of the terminal device. Optionally, implementing uplink data transmission performed by a terminal device may be understood as follows: At least two terminal devices are allowed to perform uplink data transmission on a same time-frequency resource. Optionally, the transmission resource may be a transmission resource in one or more transmission time units following a moment at which the UE receives the signaling. A transmission time unit may be a smallest time unit for one transmission, for example, a transmission time interval (Transmission Time Interval, "TTI" for short), and its value may be 1 ms; or a transmission time unit may be a preset transmission time unit.

5. Grant-free transmission may mean: A terminal device performs uplink data transmission without a grant from a network device. The grant may mean: The terminal device sends an uplink scheduling request to the network device; and after receiving the scheduling request, the network device sends an uplink grant to the terminal device, where the uplink grant indicates an uplink transmission resource allocated to the terminal device.

6. Grant-free transmission may mean a contention-based transmission mode, and may specifically mean: Multiple terminals perform uplink data transmission on a same pre-allocated time-frequency resource simultaneously without a grant from a base station.

The data may comprise service data or signaling data.

The blind detection may be understood as detection performed, when it is unknown in advance whether data arrives, on data that may arrive. The blind detection may also be understood as detection performed without an explicit signaling indication.

The transmission resource may include but is not limited to one or a combination of the following resources: a time domain resource, such as a radio frame, a subframe, or a symbol; a frequency domain resource, such as a subcarrier or a resource block; a space domain resource, such as a transmit antenna or a beam; a code domain resource, such as an SCMA codebook, a low density signature (Low Density Signature, "LDS" for short), or a CDMA code; or an uplink pilot resource.

The foregoing transmission resources may be used for transmission performed according to a control mechanism including but not limited to the following: uplink power control such as uplink transmit power upper limit control; modulation and coding scheme setting such as transport block size setting, bit rate setting, and modulation order setting; and a retransmission mechanism such as a hybrid automatic repeat request (Hybrid Automatic Repeat reQuest, "HARQ" for short) mechanism.

A contention transmission unit (Contention Transmission Unit, "CTU" for short) may be a basic transmission resource for grant-free transmission. The CTU may be a transmission resource combining a time resource, a frequency resource, and a code domain resource, may be a transmission resource combining a time resource, a frequency resource, and a pilot resource, or may be a transmission resource combining a time resource, a frequency resource, a code domain resource, and a pilot resource. A CTU access region may be a time-frequency region for grant-free transmission.

A technical solution for uplink grant-free transmission is provided in a patent application numbered PCT/CN2014/073084 and entitled "System and Method for Uplink Grant-free Transmission Scheme". It is proposed in the application PCT/CN2014/073084 that a radio resource may be divided into various CTUs, and that UE may be mapped to a CTU. One code group may be allocated to each CTU. The allocated code group may be a group of CDMA codes, an SCMA codebook set, an LDS group, a signature (signature) group, or the like. Each code may be corresponding to a group of pilots. A user may select a code and a pilot in a pilot group corresponding to the code to perform uplink transmission. Content of the application PCT/CN2014/073084 may also be understood as a part incorporated into content of the embodiments of the present invention by reference, and details are not described herein.

After accessing the network device 102, the terminal devices 104 to 114 may report their own capability information to the network device 102. The capability information may include information used to indicate whether the terminal devices 104 to 114 are capable of performing uplink grant-free transmission. In this way, the network device 102 may use, according to capability information reported by each terminal device, an uplink grant-free transmission mechanism or a conventional request-grant mechanism to communicate with the terminal device. Optionally, the network device 102 may notify the terminal device of required information for performing uplink grant-free transmission. For example, the network device 102 may instruct the terminal device to perform uplink grant-free transmission, and send search space information, CAR information, CTU information, modulation and coding scheme information, and the like to the terminal device. Each terminal device is mapped to one or more CTUs, and a mapping rule may be predefined, or may be set by the network device. The terminal device may select one code and one pilot in a pilot group corresponding to the code to perform uplink transmission. However, this is not limited in this embodiment of the present invention. It should be understood that this embodiment of the present invention may also be applied to another communications system different from that shown FIG. 1. This is not limited in this embodiment of the present invention.

Figure 2:
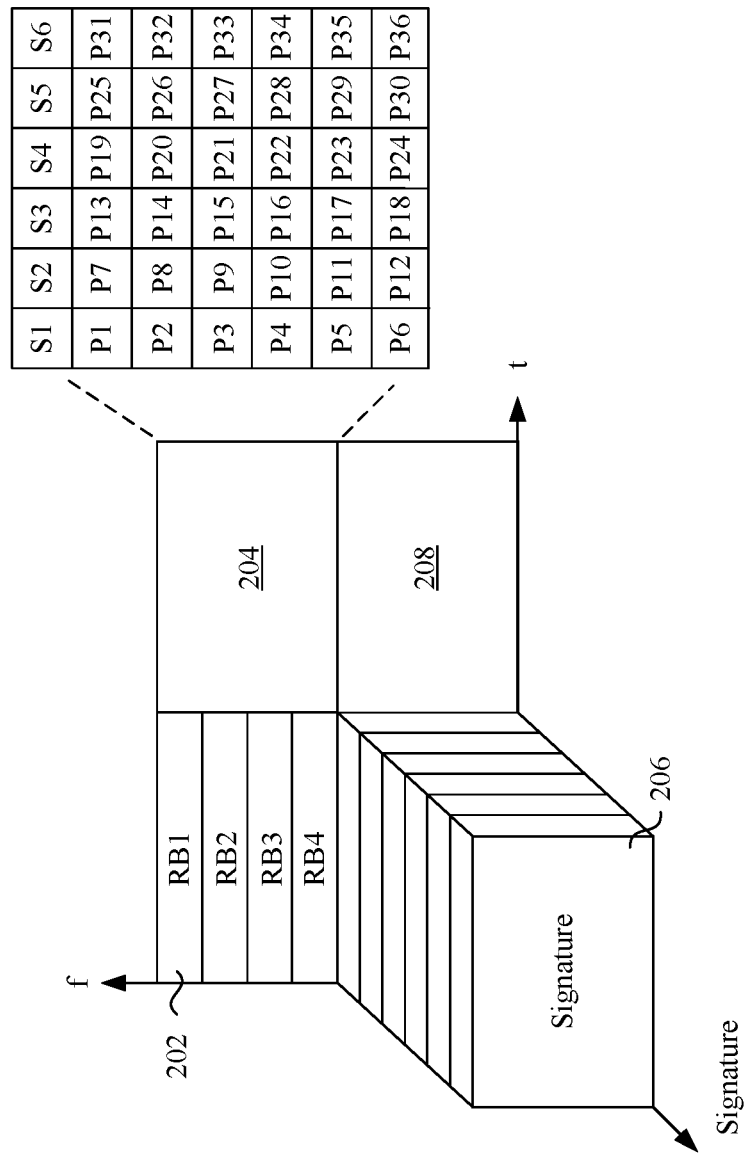
FIG. 2 is a schematic diagram of CAR and contention transmission unit (CTU) definitions according to an embodiment of the present invention.

FIG. 2 shows an example of four CARs 202 to 208. An available bandwidth of a system is divided into multiple different time-frequency regions. Each CAR occupies different resource blocks. Optionally, a quantity of resource blocks occupied by each CAR may be predefined. For example, the CAR 202 occupies resource blocks (Resource Block, "RB" for short) 1 to 4 of a frequency band. As shown in FIG. 2, each CAR may be further divided into at least one CTU, and each CTU is a combination of specific time, a specific frequency, a specific signature, and a specific pilot. All CARs in FIG. 2 are corresponding to a same CTU mapping relationship. Herein, for ease of description, a mapping relationship of four CARs is shown from different perspectives, but this embodiment of the present invention is not limited thereto. As shown in FIG. 2, each CAR supports six signatures (S1 to S6), and each signature may be corresponding to six pilots. Therefore, there are a total of 36 pilots (P1 to P36) that are corresponding to 36 CTUs. However, this embodiment of the present invention is not limited thereto.

It should be understood that FIG. 2 shows an example of four CARs and each CAR includes 36 CTUs, but another quantity of CARs may be included in this embodiment of the present invention and each CAR may include another quantity of CTUs. This is not limited in this embodiment of the present invention.

It should be understood that, a grant-free transmission resource in this embodiment of the present invention is the aforementioned transmission resource for grant-free transmission.

Figure 3:
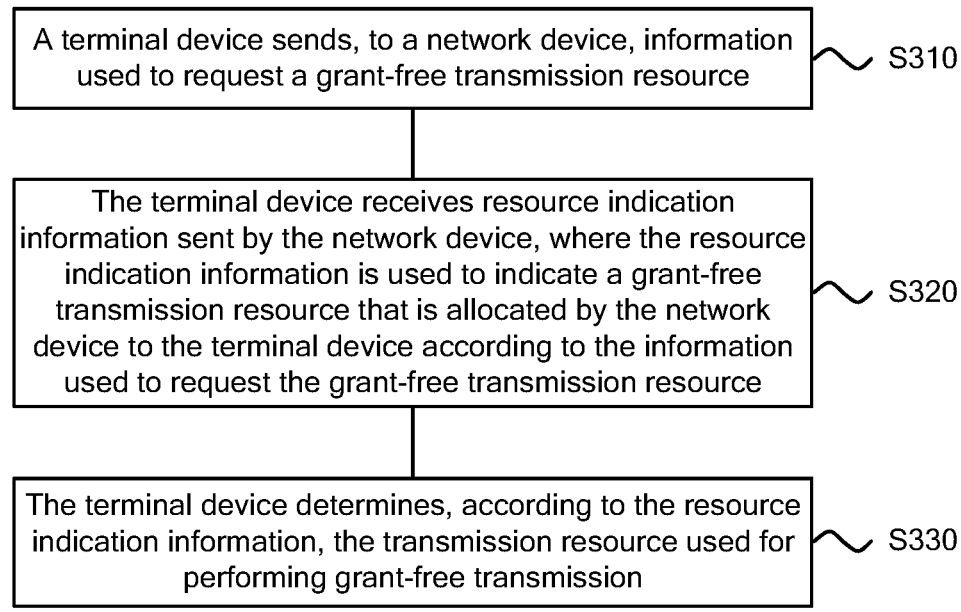
FIG. 3 is a schematic flowchart of an uplink data transmission method according to an embodiment of the present invention.

FIG. 3 shows an uplink data transmission method 300 according to an embodiment of the present invention. The method 300 is executed by a terminal device. The method 300 includes:

S310. The terminal device sends, to a network device, information used to request a grant-free transmission resource.

S320. The terminal device receives resource indication information sent by the network device, where the resource indication information is used to indicate a grant-free transmission resource that is allocated by the network device to the terminal device according to the information used to request the grant-free transmission resource.

S330. The terminal device determines, according to the resource indication information, the transmission resource used for performing grant-free transmission.

Therefore, according to the uplink data transmission method in this embodiment of the present invention, the terminal device sends, to the network device, the information used to request the grant-free transmission resource, and receives the resource indication information sent by the network device. The terminal device can perform uplink data transmission on the grant-free transmission resource allocated by the network device to the terminal device. This implements contention-based uplink data transmission and improves data transmission efficiency of a system.

Specifically, in S310 of this embodiment of the present invention, the terminal device may request a grant-free transmission resource in an explicit manner. For example, the terminal device may send resource request information to obtain, from the network device, permission to use an uplink grant-free transmission resource. For example, the terminal device may send the resource request information by sending radio resource control (Radio Resource Control, "RRC" for short) signaling in the third step (in a message Mesg3 sent in the third step) in a random access procedure, or may send the resource request information by sending Media Access Control (Media Access Control, "MAC" for short) signaling in the third step in a random access procedure.

It should be understood that in this embodiment of the present invention, the terminal device may alternatively request a grant-free transmission resource by sending an independent message, or may request a grant-free transmission resource in an implicit manner in the first step in random access. For example, the terminal device requests a grant-free transmission resource by using a particular random access preamble sequence, by sending a random access preamble sequence on a particular random access channel, or by using a combination of the particular random access preamble sequence and the particular random access channel A specific manner of sending the information used to request a grant-free resource is not limited in this embodiment of the present invention.

In S320 and S330, after receiving the information sent by the terminal device, the network device allocates the grant-free transmission resource to the terminal device and sends the resource indication information to the terminal device. The terminal device may perform uplink data transmission on the grant-free transmission resource. The resource indication information includes one or a combination of time domain location information, frequency domain location information, code domain location information, or pilot information used to indicate the grant-free transmission resource.

For example, the network device may determine a frequency domain range and a time domain range as the grant-free transmission resources for the terminal device to use. The network device may alternatively determine a frequency domain range for the terminal device to use, and the terminal device can perform grant-free transmission at any time within the frequency domain range. The network device may alternatively determine a time domain range for the terminal device to use, and the terminal device can perform grant-free transmission on any frequency band within the time domain range. Alternatively, the network device may allocate a code domain resource or a pilot to the terminal device. The resource indication information may include one or a combination of the foregoing resources. It should be understood that the network device may allocate one or more grant-free transmission resources to the terminal device. This is not limited in this embodiment of the present invention.

Specifically, the resource indication information may include information about a radio frame, a subframe, a symbol, a subcarrier, and a resource block, and may further include information about an antenna, a beam, a code group, and the like. Optionally, in this embodiment of the present invention, the resource indication information may include frequency domain location information, or more specifically, a frequency domain location index. A frequency domain location herein may be a location of a sub-band, in a frequency domain, occupied by the grant-free transmission resource. For example, the sub-band may be a sub-band in an orthogonal frequency division multiplexing (Orthogonal Frequency Division Multiplexing, "OFDM" for short) system, a sub-band in a filtered orthogonal frequency division multiplexing (Filtered Orthogonal Frequency Division Multiplexing, "F-OFDM" for short) system, or a sub-band in another system. This is not limited in this embodiment of the present invention.

In the F-OFDM technology in this embodiment of the present invention, a spectrum may be divided into multiple sub-bands, and a sub-band has a set of sub-band numerology (numerology in English). Numerology (numerology) of different sub-bands may be the same or may be different. Sub-band numerology may include at least one of a subcarrier spacing, a transmission time interval (Transmission Time Interval, TTI) length, a symbol length, a symbol quantity, a cyclic prefix (Cyclic Prefix, CP) length, or the like. The sub-band numerology may be preconfigured, or may be adapted flexibly according to a service load status. Different types of services may use different sub-bands. For example, a conventional voice/video service, an Internet of Things (Internet of Things, IOT) service, a real-time Internet of Vehicles service, and a multimedia broadcast multicast service (Multimedia broadcast multicast service, MBMS) are distributed on different sub-bands.

All resources used for grant-free transmission may be configured in the network device and each terminal device in a form of a table, an array, or the like. In the resource indication information, an index, an identifier, or the like is used to notify the terminal device of the grant-free transmission resource allocated to the terminal device. Preferably, the resource indication information includes one or a combination of an index of the grant-free transmission resource, an index of a time domain location of the grant-free transmission resource, an index of a frequency domain location of the grant-free transmission resource, an index of a code domain location of the grant-free transmission resource, or an index of a pilot of the grant-free transmission resource.

In this embodiment of the present invention, that the terminal device sends, to a network device, information used to request a grant-free transmission resource in S310 may include: The terminal device sends resource request information to the network device in the third step in random access, to request the grant-free transmission resource. In other words, a message 3 (Msg3) sent by the terminal device to the network device in the third step in random access carries the resource request information, to request the grant-free transmission resource. In this embodiment of the present invention, basic steps in an existing random access procedure are not changed, but in a step of sending a message in the random access procedure, related information about the grant-free transmission resource is added.

Therefore, a good compatibility with the existing random access procedure is achieved.

In this embodiment of the present invention, the resource request information is used by the terminal device to request the grant-free transmission resource from the network device. In addition, the resource request information may further include transmission characteristic information. The transmission characteristic information is used to indicate a transmission characteristic of the grant-free transmission resource of the terminal device. For example, the transmission characteristic information may include at least one of latency characteristic information, power consumption characteristic information, or transmission time interval (TTI) characteristic information.

Specifically, in different cases, different terminal devices may need to use grant-free transmission resources of different performance to perform uplink data transmission. For example, when the terminal device transmits service data that requires a latency to be extremely low, such as real-time control signaling, a grant-free transmission resource with a short TTI needs to be used. When transmit power of the terminal device is relatively low, or a radio channel of the terminal device is in a bad condition, or the terminal device transmits latency-insensitive service data such as wireless meter reading, a grant-free transmission resource with a long TTI needs to be used. This requires that permission obtained by the terminal device from the network device for the grant-free transmission resource should meet a characteristic requirement of a grant-free service of the terminal device.

In an example, a system may set different types of grant-free transmission resources such as a common grant-free transmission resource and a low-latency grant-free transmission resource. When the terminal device needs to perform extremely low-latency service data transmission, the terminal device notifies the network device of this requirement by using the transmission characteristic information, so as to obtain a low-latency grant-free transmission resource. Otherwise, the terminal device needs a common grant-free transmission resource or poses no requirement on a transmission characteristic of a grant-free transmission resource, and the network device allocates a common grant-free transmission resource to the terminal device.

Therefore, in this embodiment of the present invention, the terminal device notifies, by sending the transmission characteristic information, the network device of a grant-free service transmission characteristic requirement of the terminal device, for example, low-latency/short-TTI grant-free service transmission or low-power/long-TTI grant-free transmission. After receiving the information, the network device schedules an appropriate grant-free transmission resource for the terminal device to use.

It should be understood that the transmission characteristic information in this embodiment of the present invention is not limited to the latency characteristic information, the power consumption characteristic information, the transmission time interval (TTI) characteristic information, and the like, but may further include another type of transmission characteristic requirement information. This is not limited in this embodiment of the present invention.

In this embodiment of the present invention, optionally, the resource request information includes a terminal device identifier, so that the network device avoids a contention collision between multiple terminal devices according to the terminal device identifier. After receiving the resource request information sent by the terminal device, the network device allocates different grant-free transmission resources to different terminal devices according to the terminal device identifier or a user identity in the resource request information, and sends the resource indication information to a user, to avoid a contention collision caused by multi-user concurrent access.

Figure 4:
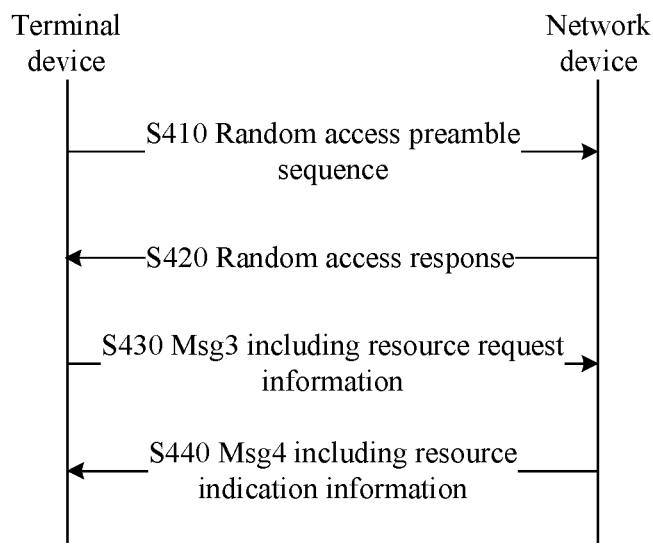
FIG. 4 is a schematic flowchart of an uplink data transmission method according to another embodiment of the present invention.

In a specific example, the terminal device may obtain the grant-free transmission resource from the network device by using the third step in the random access procedure. As shown in FIG. 4, the specific random access procedure includes the following steps.

S410. The first step: A terminal device selects a random access preamble sequence and sends the random access preamble sequence to a network device by using a random access channel (Random Access Channel, "RACH" for short), to notify the network device that there is a random access request, so that the network device can estimate an uplink timing offset of the terminal device.

S420. The second step: After obtaining, by means of detection, the random access preamble sequence on the RACH, the network device sends a random access response to the terminal device, to notify the terminal device of the random access preamble sequence detected by the network device and information about the RACH on which the random access preamble sequence is located, instructs the network device to adjust the uplink (UL) timing offset, and schedules, for the terminal device, an UL resource used for sending a Msg3 in the third step.

S430. The third step: After receiving the random access response matching the random access preamble sequence sent by the terminal device, the terminal device sends the Msg3 by using the UL resource scheduled by the random access response, where the Msg3 includes resource request information for requesting a grant-free transmission resource from the network device. The resource request information may be sent by using RRC signaling or MAC signaling, indicating that the terminal device needs to perform uplink grant-free transmission or indicating that the terminal device supports uplink grant-free transmission. The resource request information may further indicate a characteristic requirement of the uplink grant-free transmission. For example, the resource request information may further include transmission characteristic information used to indicate a transmission characteristic of the grant-free transmission resource of the terminal device. For example, the transmission characteristic information includes at least one of latency characteristic information, power consumption characteristic information, or transmission time interval (TTI) characteristic information.

In an implementation, in the Msg3, the terminal device sends only the resource request information used to request the grant-free transmission resource from the network device, but does not send an RRC connection request (RRCConnectionRequest) used to request a granted transmission resource (a contention free uplink transmission resource). To avoid a contention collision between multiple terminal devices, related information about a terminal device identifier may also be carried in signaling carrying the resource request information, or the terminal device identifier may be carried in another signaling. This is not limited in this embodiment of the present invention.

In another implementation, in the Msg3, the terminal device sends both the resource request information used to request the grant-free transmission resource from the network device and an RRCConnectionRequest to the network device, to request a granted transmission resource.

S440. The fourth step: After receiving signaling carrying the resource request information, the network device sends, according to a detected terminal device identifier, Msg4 acknowledgement information to a terminal device corresponding to the terminal device identifier, to avoid a contention collision caused by concurrent access made by multiple terminal devices; and the network device sends resource indication information used to indicate a grant-free transmission resource, so that the terminal device can perform uplink grant-free transmission.

In an implementation (corresponding to the implementation of S430), in the Msg4, the network device sends, to the terminal device, only the resource indication information used to indicate a grant-free transmission resource, but does not send configuration information of a granted transmission resource, such as an RRC connection setup (RRCConnectionSetup). In this case, the terminal device may not need to establish an RRC connection, but directly send service data to the network device by means of uplink grant-free transmission.

In another implementation (corresponding to the another implementation of S430), in the Msg4, the network device sends both the resource indication information used to indicate a grant-free transmission resource and an RRCConnectionSetup to the terminal device, so that the terminal device can use both the grant-free transmission resource and the granted transmission resource to transmit data. Preferably, the terminal device may use the grant-free transmission resource to transmit small packet data and use the granted transmission resource to transmit large packet data. This is not limited in this embodiment of the present invention. This implementation is well compatible with an existing solution for requesting a granted transmission resource in the LTE system.

It should be understood that the resource indication information, RRCConnectionSetup, and the like that are sent by the network device to the terminal device may be sent by using RRC signaling in the Msg3, or may be sent by using MAC signaling in the Msg3. However, this is not limited in this embodiment of the present invention.

In this embodiment of the present invention, optionally, that the terminal device sends, to a network device, information used to request a grant-free transmission resource in S310 includes: The terminal device sends, to the network device by using radio resource control (RRC) signaling, resource request information used to request the grant-free transmission resource.

Specifically, the terminal device may add a definition of a grant-free transmission resource request to (RRC) signaling RRCConnectionRequest that is sent to the network device. For example, a specific form is as follows. The added definition is contentionAccess, indicating that the terminal device requests a grant-free transmission resource. contentionAccess-fast indicates that a requested grant-free transmission resource is a short TTI resource. It should be understood that the foregoing is only an example, and another field or definition may be added to indicate that the terminal device requests a grant-free transmission resource. A specific implementation is not limited in the present invention.

RRCConnectionRequest Message

```
-- ASN1START
RRCConnectionRequest ::=          SEQUENCE {
    criticalExtensions                CHOICE {
        rrcConnectionRequest-r8           RRCConnectionRequest-r8-IEs,
        criticalExtensionsFuture          SEQUENCE { }
    }
}
RRCConnectionRequest-r8-IEs ::=   SEQUENCE {
    ue-Identity                       Initial UE-Identity,
    establishmentCause                EstablishmentCause,
    spare                             BIT STRING (SIZE (1))
}
InitialUE-Identity ::=            CHOICE {
    s-TMSI                            S-TMSI,
    randomValue                       BIT STRING (SIZE (40))
}
EstablishmentCause ::=       ENUMERATED {
                                  emergency,    highPriorityAccess,    mt-Access,
mo-Signalling,
                                  mo-Data,               delayTolerantAccess-v1020,
contentionAccess, contentionAccess-fast}
-- ASN1STOP
```

In addition, the terminal device may further send, to the network device, new RRC signaling to carry the resource request information used to request the grant-free transmission resource, instead of adding the resource request information to the RRCConnectionRequest.

For example, a specific form is as follows.
ContentionAccessType::=
ENUMERATED{contentionAccess, contentionAccess-fast, contentionAccess-reliable, spare} is used to define that the terminal device requests a grant-free transmission resource, and the requested grant-free transmission resource is a short TTI resource. It should be understood that the foregoing is only an example, and another field or definition may be added to indicate that the terminal device requests a grant-free transmission resource. A specific implementation is not limited in the present invention.

ContentionAccessRequest Message

```
-- ASN1START
ContentionAccessRequest ::=          SEQUENCE {
    criticalExtensions                   CHOICE {
        ContentionAccessRequest-r8           ContentionAccessRequest-r8-IEs,
        criticalExtensionsFuture             SEQUENCE { }
    }
}
ContentionAccessRequest-r8-IEs ::=   SEQUENCE {
    ue-Identity                          Initial UE-Identity,
    contentionAccessType                 ContentionAccess Type,
    spare                                BIT STRING (SIZE (1))
}
InitialUE-Identity ::=               CHOICE {
    s-TMSI                               S-TMSI,
    random Value                         BIT STRING (SIZE (40))
}
ContentionAccessType ::=     ENUMERATED {
                                 contentionAccess,        contentionAccess-fast,
contentionAccess-reliable, spare}
-- ASN1STOP
```

In this embodiment of the present invention, optionally, that the terminal device sends, to a network device, information used to request a grant-free transmission resource in S310 includes: The terminal device sends, to the network device by using Media Access Control (MAC) signaling, resource request information used to request the grant-free transmission resource.

Specifically, a MAC control element of contention access is defined by a MAC protocol data unit (Protocol Data Unit, "PDU" for short) sub-header having a logical channel identifier (Logical Channel Identifier, "LCID" for short), as shown in Table 1. A contention access field has a fixed size and may be defined as a contention access field in Table 1. The field includes a contention access request of the terminal device, and the field may be eight bits long.

TABLE 1

LCID value of an uplink shared channel

| Index | LCID value |
|---|---|
| 00000 | CCCH |
| 00001-01010 | Identity of the logical channel |
| 01011-10111 | Reserved |
| 11000 | Contention Access |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

In this embodiment of the present invention, the network device and the terminal device may agree that different particular random access configurations are corresponding to different types of grant-free transmission resource requests. For example, some particular random access configurations are corresponding to a low-latency grant-free transmission resource request, and some other particular random access configurations are corresponding to a long-TTI grant-free transmission resource request. The particular random access configuration may be a random access preamble sequence belonging to a particular random access preamble sequence group, may be a particular RACH used for sending a random access preamble sequence, or may be a combination of a random access preamble sequence in a particular random access preamble sequence group and a particular RACH. This is not limited in this embodiment of the present invention. Agreeing on a particular random access configuration by the network device and the terminal device may be implemented by using a standard specification, or may be implemented by sending a message (for example, sending, by the network device, a random access configuration message to the terminal device). A specific implementation method is not limited in this embodiment of the present invention.

Optionally, in an embodiment, that the terminal device sends, to a network device, information used to request a grant-free transmission resource in S310 includes: The terminal device sends a first random access preamble sequence, to request the grant-free transmission resource from the network device, where the first random access preamble sequence belongs to a first random access preamble sequence group, the first random access preamble sequence group is used to request a grant-free transmission resource, and the first random access preamble sequence group includes at least one random access preamble sequence.

Specifically, the terminal device sends a random access preamble sequence in the first step in the random access procedure. The terminal device may use a particular random access preamble sequence (for example, the first random access preamble sequence) to request the grant-free transmission resource from the network device. The network device and the terminal device may preset a group of particular random access preamble sequences (for example, the first random access preamble sequence group) for the terminal device to request the grant-free transmission resource. After receiving the first random access preamble sequence sent by the terminal device, the network device detects a complex waveform corresponding to the first random access preamble sequence, so as to determine whether the first random access preamble sequence sent by the terminal device belongs to the first random access preamble sequence group. When determining that the first random access preamble sequence belongs to the first random access preamble sequence group, the network device may determine that the terminal device is requesting a grant-free transmission resource, and allocate the grant-free transmission resource to the terminal device.

Optionally, in this embodiment of the present invention, before the terminal device sends the first random access preamble sequence, to request the grant-free transmission resource from the network device, the method 300 further includes: The terminal device selects the first random access preamble sequence of the first random access preamble sequence group from multiple random access preamble sequence groups, where the multiple random access preamble sequence groups include at least the first random access preamble sequence group and a second random access preamble sequence group, and the second random access preamble sequence group is used to request a granted transmission resource.

Specifically, the first random access preamble sequence sent by the terminal device is selected from the multiple random access preamble sequence groups. A system groups random access preamble sequences (for example, 64 random access preamble sequences in the prior art), for example, into the first random access preamble sequence group and the second random access preamble sequence group. The first random access preamble sequence group is used to request a grant-free transmission resource, and the second random access preamble sequence group is used to request a granted transmission resource. When the terminal device needs to request a grant-free transmission resource, the terminal device selects the first random access preamble sequence of the first random access preamble sequence group from the multiple random access preamble sequence groups, and sends the first random access preamble sequence to the network device. It should be understood that the system may group the random access preamble sequences into more random access preamble sequence groups, and the two groups in the foregoing example do not impose a limitation.

When determining that the first random access preamble sequence belongs to the first random access preamble sequence group, the network device may determine that the terminal device is requesting a grant-free transmission resource, and allocate the grant-free transmission resource to the terminal device. When determining that the first random access preamble sequence does not belong to the first random access preamble sequence group, but belongs to, for example, the second random access preamble sequence group (corresponding to a request for the granted transmission resource), the network device may determine that the terminal device is requesting the granted transmission resource, and allocate the granted transmission resource to the terminal device.

In this embodiment of the present invention, the first random access preamble sequence group includes M first random access preamble sequence subgroups, and the M first random access preamble sequence subgroups are obtained by dividing according to a transmission characteristic. The transmission characteristic may include one or more of a latency characteristic, a power consumption characteristic, or a transmission time interval TTI length characteristic, and may further include some other characteristics, parameters, or the like used to indicate performance of grant-free transmission resources. This is not limited in this embodiment of the present invention.

Further, the network device and the terminal device may agree on multiple different random access preamble sequence subgroups for different types of grant-free transmission resource requests. For example, the first random access preamble sequence group may be divided into multiple (for example, M) random access preamble sequence subgroups, including the first random access preamble sequence subgroup, a second random access preamble sequence subgroup, and so on. Different random access preamble sequence subgroups are corresponding to grant-free transmission resources with different transmission characteristics. It should be understood that a quantity of the random access preamble sequence subgroups may be determined according to transmission performance classification of grant-free transmission resources. The quantity of the random access preamble sequence subgroups is not limited in this embodiment of the present invention. In other words, the terminal device determines, according to a transmission characteristic requirement on a grant-free transmission resource, and a mapping relationship between a transmission characteristic of a grant-free transmission resource and a random access preamble sequence subgroup, a random access preamble sequence subgroup corresponding to the requirement. The terminal device sends, to the network device, a random access preamble sequence in the random access preamble sequence subgroup corresponding to the requirement.

Similarly, in an embodiment, that the terminal device sends, to a network device, information used to request a grant-free transmission resource in S310 includes: The terminal device sends a random access preamble sequence on a first random access channel, to request the grant-free transmission resource from the network device, where the first random access channel belongs to a first random access channel group, the first random access channel group is used to request a grant-free transmission resource, and the first random access channel group includes at least one random access channel.

In this embodiment of the present invention, before the terminal device sends the random access preamble sequence on the first random access channel, the method 300 further includes: The terminal device selects the first random access channel of the first random access channel group from multiple random access channel groups, where the multiple random access channel groups include at least the first random access channel group and a second random access channel group, and the second random access channel group is used to request a granted transmission resource.

Specifically, the random access channel used by the terminal device to send the random access preamble sequence is selected from the multiple random access channel groups. The system groups random access channel groups, for example, into the first random access channel group and a second random access channel group. The first random access channel group is used to request a grant-free transmission resource, and the second random access channel group is used to request a granted transmission resource. When the terminal device needs to request a grant-free transmission resource, the terminal device selects the first random access channel of the first random access channel group from the multiple random access channel groups, and sends the random access preamble sequence on the channel. It should be understood that the system may group the random access channels into more random access channel groups, and the two groups in the foregoing example do not impose a limitation.

In this embodiment of the present invention, the first random access channel group includes N random access channel subgroups, and the N random access channel subgroups are obtained by dividing according to a transmission characteristic. Specifically, the system may further divide the first random access channel group used to request a grant-free transmission resource into the N random access channel subgroups for grant-free transmission resources with different transmission characteristics. The terminal device determines, according to a transmission characteristic requirement on a grant-free transmission resource, and a mapping relationship between a transmission characteristic of a grant-free transmission resource and a random access channel, a random access channel corresponding to the requirement and used for sending the random access preamble sequence. The terminal device sends the random access preamble sequence to the network device on the random access channel corresponding to the requirement.

Similarly, in an embodiment, that the terminal device sends, to a network device, information used to request a grant-free transmission resource in S310 includes: The terminal device sends a first random access preamble sequence on a first random access channel, to request the grant-free transmission resource from the network device, where a combination of the first random access channel and the first random access preamble sequence belongs to a first combination set, the first combination set is used to request a grant-free transmission resource, and the first combination set includes at least one combination of a random access channel and a random access preamble sequence.

In this embodiment of the present invention, before the terminal device sends the first random access preamble sequence on the first random access channel, the method 300 further includes: The terminal device selects the combination of the first random access channel and the first random access preamble sequence from multiple combination sets, where the combination is in the first combination set, the multiple combination sets include at least the first combination set and a second combination set, and the second combination set is used to request a granted transmission resource. The first combination set includes K combination subsets, and the K combination subsets are obtained by dividing according to a transmission characteristic. A specific implementation of this embodiment of the present invention has a principle similar to that of the above-described implementation of requesting the grant-free transmission resource by using the random access preamble sequence belonging to the particular random access preamble sequence group or by using the particular RACH that is used to send the random access preamble sequence. Details are not repeated herein.

Figure 5:
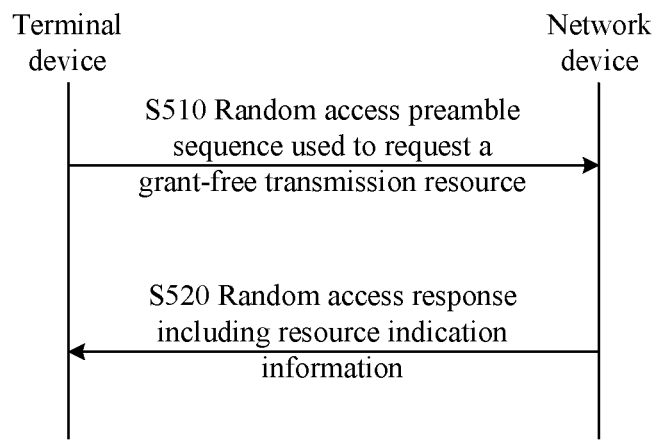
FIG. 5 is a schematic flowchart of an uplink data transmission method according to still another embodiment of the present invention.

In a specific example, the terminal device may obtain the grant-free transmission resource from the network device by sending a random access preamble sequence. A specific process is shown in FIG. 5, including:

S510. The terminal device sends a random access preamble sequence to the network device by using a particular random access configuration, to request a grant-free transmission resource. The particular random access configuration is used to notify the network device that the terminal device needs to perform uplink grant-free transmission, or to notify the network device that the terminal device can support uplink grant-free transmission. The particular random access configuration may be one of the above-described three configurations.

S520. After receiving the random access preamble sequence on a RACH, the network device detects the random access preamble sequence and determines that the terminal device requests a grant-free transmission resource. The network device detects a random access configuration of the terminal device, including a random access preamble sequence group to which the random access preamble sequence belongs, the RACH used by the terminal device to send the random access preamble sequence, or a combination of the foregoing two configurations. If finding that the random access configuration matches the particular random access configuration corresponding to the grant-free transmission resource request, the network device sends a random access response, to notify the terminal device of the random access preamble sequence detected by the network device and information about the RACH on which the random access preamble sequence is located. The random access response includes resource indication information, so that the terminal device can perform uplink grant-free transmission by using a resource indicated in the resource indication information.

Correspondingly, the method in this embodiment of the present invention has corresponding changes in terms of both RRC signaling and a MAC layer, compared with the existing random access preamble sequence sending. In the following, description is based on an example in which the particular random access configuration is that a random access preamble sequence group to which the random access preamble sequence belongs is corresponding to the grant-free transmission resource request. Specifically, different from that existing 64 random access preamble sequences are corresponding to only two random access preamble sequence groups, A and B, according to the method in this embodiment of the present invention, the 64 random access preamble sequences may be separately defined in more groups. In terms of RRC signaling, RACH-ConfigCommon is used to indicate a common random access parameter. RACH-ConfigCommon is specifically defined as follows. sizeOfRA-PreamblesGroupC ENUMERATED {n1, n2, n4, n8} is used to define a new random access preamble sequence group.

RACH-ConfigCommon Information Element

```
-- ASN1START
RACH-ConfigCommon ::=      SEQUENCE {
    preambleInfo                SEQUENCE {
        numberOfRA-Preambles        ENUMERATED {
                                        n4, n8, n12, n16 ,n20,
                                        n24, n28, n32, n36, n40,
                                        n44, n48, n52, n56,n60,
                                        n64},
        preamblesGroupAConfig       SEQUENCE {
            sizeOfRA-PreamblesGroupA    ENUMERATED {
                                            n4, n8, n12, n16 ,n20, n24,
                                            n28, n32, n36, n40, n44,
                                            n48, n52, n56,n60},
            messageSizeGroupA           ENUMERATED {b56, b144,
                                            b208, b256},
            messagePowerOffsetGroupB    ENUMERATED {
                                            minusinfinity, dB0, dB5,
                                            dB8, dB10, dB12,dB15,
                                            dB18},
            sizeOfRA-PreamblesGroupC    ENUMERATED {n1, n2, n4,
                                            n8},
        }           OPTIONAL                        -- Need OP
    },
    powerRampingParameters      PowerRampingParameters,
    ra-SupervisionInfo          SEQUENCE {
        preambleTransMax            PreambleTransMax,
        ra-ResponseWindowSize       ENUMERATED {
                                        sf2, sf3, sf4, sf5, sf6, sf7,
                                        sf8, sf10},
        mac-ContentionResolutionTimer ENUMERATED {
                                        sf8, sf16, sf24, sf32, sf40,
                                        sf48, sf56, sf64}
    },
    maxHARQ-Msg3Tx              INTEGER (1..8),
    ...
}
```

MAC layer procedure definition includes two parts: random access procedure initialization and random access resource selection.

1. Random Access Procedure Initialization

If sizeOfRA-PreamblesGroupA+sizeOfRA-PreamblesGroupC is equal to numberOfRA-PreamblessizeOfRA then there is no Random Access Preambles group B. The preambles in Random Access Preamble group A are the preambles 0 to sizeOfRA-PreamblesGroupA−1, the preambles in Random Access Preamble group C are from sizeOfRA-PreamblesGroupA to sizeOfRA-PreamblesGroupC−1 and, if it exists, the preambles in Random Access Preamble group B ore the preambles sizeOfRA-PreamblesGroupC to numberOfRA-Preambles-1 from the set of 64 preambles.

2. Random Access Resource Selection

---

If ra-PreambleIndex (Random Access Preamble) and ra-PRACH-MaskIndex
(PRACH Mask Index) have been explicitly signalled and ra-PreambleIndex
is not 000000:
    the Random Access Preamble and the PRACH Mask Index are those explicitly signalled.
    else the Random Access Preamble shall be selected by the UE as follows:
        If Msg3 has not yet been transmitted, the UE shall:
            if Random Access Preambles group C exists and is indicated by upper layers to be used, then:
                select the Random Access Preambles group C;
            if Random Access Preambles group B exists and if the potential message size (data available for transmission plus MAC header and, where required, MAC control elements) is greater than messageSizeGroupA and if the path loss is less than PCMAX,c (of the Serving Cell performing the Random Access Procedure) - preambleInitialReceivedTargetPower - del-taPreambleMsg3 - messagePowerOffsetGroupB,then:
                select the Random Access Preambles group B;
            else:
                select the Random Access Preambles group A.

---

It should be understood that the foregoing random access preamble sequence group C is only an example, and more random access preamble sequence groups may be added, so as to distinguish between transmission characteristics of different grant-free transmission resources. A specific implementation is not limited in the present invention.

Correspondingly, a procedure of random access is also defined to include two steps. The first step is: The terminal device sends a random access preamble sequence to the network device, so that a random access preamble sequence group to which the random preamble sequence belongs is used to identify whether a grant-free transmission resource is requested. The second step is: The network device sends a random access response to the terminal device. Specifically, The two steps of the contention based random access procedures are:

1) Random Access Preamble on RACH in uplink:
   The preamble group C is used.
2) Random Access Response generated by MAC on DL-SCH:
   . . .
   Conveys at least RA-preamble identifier, Timing Alignment information for the pTAG, UL grant for contention based data transmissions . . .

Therefore, according to the uplink data transmission method in this embodiment of the present invention, the terminal device requests a grant-free transmission resource from the network device, receives resource indication information sent by the network device, and performs uplink data transmission on a grant-free transmission resource allocated by the network device to the terminal device. This can implement contention-based uplink data transmission and improve data transmission efficiency of the system. In addition, in this embodiment of the present invention, the terminal device sends transmission characteristic information to notify the network device of a grant-free service transmission characteristic requirement of the terminal device, for example, low-latency/short-TTI UL grant-free transmission or low-power/long-TTI UL grant-free transmission. After receiving the information, the network device schedules an appropriate grant-free transmission resource for the terminal device to use.

It should be understood that in this embodiment of the present invention, the grant-free transmission resource indicated in the resource indication information may be a grant-free transmission resource corresponding to the resource request information sent by the terminal device, or may be a grant-free transmission resource determined by the network device for the terminal device according to a current network or resource status, where the grant-free transmission resource may be not completely corresponding to the resource request information sent by the terminal device. This is not limited in this embodiment of the present invention.

It should be further understood that in the embodiments of the present invention, sequence numbers of the foregoing processes do not mean execution orders. The execution orders of the processes should be determined according to functions and internal logic of the processes, and should not be construed as any limitation on implementation processes of the embodiments of the present invention.

The uplink data transmission method according to the embodiment of the present invention is described in the above with reference to FIG. 3 to FIG. 5 from the perspective of a terminal device. An uplink data transmission method according to an embodiment of the present invention is described in the following with reference to FIG. 6 from the perspective of a network device.

Figure 6:
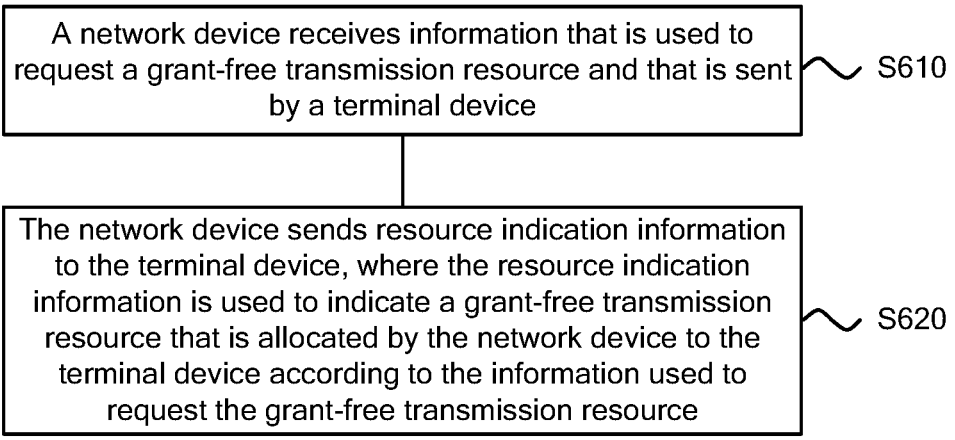
FIG. 6 is a schematic flowchart of an uplink data transmission method according to still another embodiment of the present invention.

As shown in FIG. 6, the uplink data transmission method 600 according to this embodiment of the present invention may be executed by, for example, a network device in a communications system. The method 600 includes:

S610. The network device receives information that is used to request a grant-free transmission resource and that is sent by a terminal device.

S620. The network device sends resource indication information to the terminal device, where the resource indication information is used to indicate a grant-free transmission resource that is allocated by the network device to the terminal device according to the information used to request the grant-free transmission resource.

Therefore, according to the uplink data transmission method in this embodiment of the present invention, the network device receives the information that is used to request the grant-free transmission resource and that is sent by the terminal device, and allocates the grant-free transmission resource to the terminal device, so that the terminal device performs uplink data transmission on the grant-free transmission resource. This implements contention-based uplink data transmission and improves data transmission efficiency of a system.

In this embodiment of the present invention, optionally, that the network device receives information that is used to request a grant-free transmission resource and that is sent by a terminal device in S610 includes:

The network device receives a first random access preamble sequence sent by the terminal device, where the first random access preamble sequence belongs to a first random access preamble sequence group, the first random access preamble sequence group is used to request a grant-free transmission resource, and the first random access preamble sequence group includes at least one random access preamble sequence.

In this embodiment of the present invention, optionally, the first random access preamble sequence is a random access preamble sequence of the first random access preamble sequence group selected by the terminal device from multiple random access preamble sequence groups, where the multiple random access preamble sequence groups include at least the first random access preamble sequence group and a second random access preamble sequence group, and the second random access preamble sequence group is used to request a granted transmission resource.

In this embodiment of the present invention, optionally, the first random access preamble sequence group includes M first random access preamble sequence subgroups, and the M first random access preamble sequence subgroups are obtained by dividing according to a transmission characteristic.

In this embodiment of the present invention, optionally, that the network device receives information that is used to request a grant-free transmission resource and that is sent by a terminal device in S610 includes:

The network device receives a random access preamble sequence sent by the terminal device on a first random access channel, where the first random access channel belongs to a first random access channel group, the first random access channel group is used to request a grant-free transmission resource, and the first random access channel group includes at least one random access channel.

In this embodiment of the present invention, optionally, the first random access channel is a random access channel of the first random access channel group selected by the terminal device from multiple random access channel groups, where the multiple random access channel groups include at least the first random access channel group and a second random access channel group, and the second random access channel group is used to request a granted transmission resource.

In this embodiment of the present invention, optionally, the first random access channel group includes N random access channel subgroups, and the N random access channel subgroups are obtained by dividing according to a transmission characteristic.

In this embodiment of the present invention, optionally, that the network device receives information that is used to request a grant-free transmission resource and that is sent by a terminal device in S610 includes:

The network device receives a first random access preamble sequence sent by the terminal device on a first random access channel, where a combination of the first random access channel and the first random access preamble sequence belongs to a first combination set, the first combination set is used to request a grant-free transmission resource, and the first combination set includes at least one combination of a random access channel and a random access preamble sequence.

In this embodiment of the present invention, optionally, the combination of the first random access channel and the first random access preamble sequence is a combination of a random access channel and a random access preamble sequence in the first combination set that is selected by the terminal device from multiple combination sets, where the multiple combination sets include at least the first combination set and a second combination set, and the second combination set is used to request a granted transmission resource.

In this embodiment of the present invention, optionally, the first combination set includes K combination subsets, and the K combination subsets are obtained by dividing according to a transmission characteristic.

In this embodiment of the present invention, optionally, the transmission characteristic includes one or more of a latency characteristic, a power consumption characteristic, or a transmission time interval (TTI) length characteristic.

In this embodiment of the present invention, optionally, that the network device receives information that is used to request a grant-free transmission resource and that is sent by a terminal device in S610 includes:

The network device receives resource request information that is used to request the grant-free transmission resource and that is sent by the terminal device to the network device by using radio resource control (RRC) signaling.

In this embodiment of the present invention, optionally, that the network device receives information that is used to request a grant-free transmission resource and that is sent by a terminal device in S610 includes:

The network device receives resource request information that is used to request the grant-free transmission resource and that is sent by the terminal device to the network device by using Media Access Control (MAC) signaling.

In this embodiment of the present invention, optionally, the resource request information includes transmission characteristic information, where the transmission characteristic information is used to indicate a transmission characteristic of the grant-free transmission resource of the terminal device.

In this embodiment of the present invention, optionally, the transmission characteristic information includes at least one of latency characteristic information, power consumption characteristic information, or transmission time interval (TTI) characteristic information.

In this embodiment of the present invention, optionally, the resource request information includes a terminal device identifier, and the method 600 further includes:

The network device allocates different grant-free transmission resources to different terminal devices according to the terminal device identifier.

In this embodiment of the present invention, optionally, the resource indication information includes one or a combination of time domain location information, frequency domain location information, code domain location information, or pilot information used to indicate the grant-free transmission resource.

In this embodiment of the present invention, optionally, the resource indication information includes one or a combination of an index of the grant-free transmission resource, an index of a time domain location of the grant-free transmission resource, an index of a frequency domain location of the grant-free transmission resource, an index of a code domain location of the grant-free transmission resource, or an index of a pilot of the grant-free transmission resource.

In this embodiment of the present invention, optionally, the frequency domain location may include a location of a sub-band occupied by the grant-free transmission resource in a frequency domain.

Therefore, according to the uplink data transmission method in this embodiment of the present invention, the network device receives the information that is used to request the grant-free transmission resource and that is sent by the terminal device, and allocates the grant-free transmission resource to the terminal device, so that the terminal device performs uplink data transmission on the grant-free transmission resource. This implements contention-based uplink data transmission and improves data transmission efficiency of the system.

The data transmission method in the embodiments of the present invention is described in detail in the above with reference to FIG. 3 to FIG. 6. A terminal device and a network device in embodiments of the present invention are described in the following with reference to FIG. 7 to FIG. 10.

Figure 7:
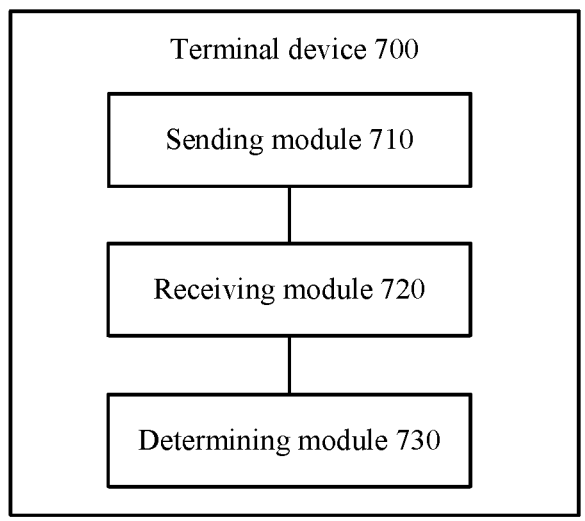
FIG. 7 is a schematic block diagram of a terminal device according to an embodiment of the present invention.

FIG. 7 shows a terminal device 700 according to an embodiment of the present invention. As shown in FIG. 7, the terminal device 700 includes:

a sending module 710, configured to send, to a network device, information used to request a grant-free transmission resource;

a receiving module 720, configured to receive resource indication information sent by the network device, where the resource indication information is used to indicate a grant-free transmission resource that is allocated by the network device to the terminal device 700 according to the information that is used to request the grant-free transmission resource and that is sent by the sending module 710; and a determining module 730, configured to determine, according to the resource indication information received by the receiving module 720, the transmission resource used for performing grant-free transmission.

Therefore, the terminal device in this embodiment of the present invention sends, to the network device, the information used to request the grant-free transmission resource, and receives the resource indication information sent by the network device. The terminal device can perform uplink data transmission on the grant-free transmission resource allocated by the network device to the terminal device. This implements contention-based uplink data transmission and improves data transmission efficiency of a system.

Optionally, in an embodiment, the sending module 710 is specifically configured to send a first random access preamble sequence, to request the grant-free transmission resource from the network device, where the first random access preamble sequence belongs to a first random access preamble sequence group, the first random access preamble sequence group is used to request a grant-free transmission resource, and the first random access preamble sequence group includes at least one random access preamble sequence.

Optionally, in an embodiment, the terminal device 700 further includes a selection module, configured to: before the sending module 710 sends the first random access preamble sequence, to request the grant-free transmission resource from the network device, select the first random access preamble sequence of the first random access preamble sequence group from multiple random access preamble sequence groups, where the multiple random access preamble sequence groups include at least the first random access preamble sequence group and a second random access preamble sequence group, and the second random access preamble sequence group is used to request a granted transmission resource.

Optionally, in an embodiment, the first random access preamble sequence group includes M first random access preamble sequence subgroups, and the M first random access preamble sequence subgroups are obtained by dividing according to a transmission characteristic.

Optionally, in an embodiment, the sending module 710 is specifically configured to send a random access preamble sequence on a first random access channel, to request the grant-free transmission resource from the network device, where the first random access channel belongs to a first random access channel group, the first random access channel group is used to request a grant-free transmission resource, and the first random access channel group includes at least one random access channel.

Optionally, in an embodiment, the terminal device 700 further includes a selection module, configured to: before the sending module 710 sends the random access preamble sequence on the first random access channel, select the first random access channel of the first random access channel group from multiple random access channel groups, where the multiple random access channel groups include at least the first random access channel group and a second random access channel group, and the second random access channel group is used to request a granted transmission resource.

Optionally, in an embodiment, the first random access channel group includes N random access channel subgroups, and the N random access channel subgroups are obtained by dividing according to a transmission characteristic.

Optionally, in an embodiment, the sending module 710 is specifically configured to send a first random access preamble sequence on a first random access channel, to request the grant-free transmission resource from the network device, where a combination of the first random access channel and the first random access preamble sequence belongs to a first combination set, the first combination set is used to request a grant-free transmission resource, and the first combination set includes at least one combination of a random access channel and a random access preamble sequence.

Optionally, in an embodiment, the terminal device 700 further includes a selection module, configured to: before the sending module 710 sends the first random access preamble sequence on the first random access channel, select the combination of the first random access channel and the first random access preamble sequence from multiple combination sets, where the combination is in the first combination set, the multiple combination sets include at least the first combination set and a second combination set, and the second combination set is used to request a granted transmission resource.

Optionally, in an embodiment, the first combination set includes K combination subsets, and the K combination subsets are obtained by dividing according to a transmission characteristic.

Optionally, in an embodiment, the transmission characteristic includes one or more of a latency characteristic, a power consumption characteristic, or a transmission time interval (TTI) length characteristic.

Optionally, in an embodiment, the sending module 710 is specifically configured to send, to the network device by using radio resource control (RRC) signaling, resource request information used to request the grant-free transmission resource.

Optionally, in an embodiment, the sending module 710 is specifically configured to send, to the network device by using Media Access Control (MAC) signaling, resource request information used to request the grant-free transmission resource.

Optionally, in an embodiment, the resource request information includes transmission characteristic information, where the transmission characteristic information is used to indicate a transmission characteristic of the grant-free transmission resource of the terminal device.

Optionally, in an embodiment, the transmission characteristic information includes at least one of latency characteristic information, power consumption characteristic information, or transmission time interval (TTI) characteristic information.

Optionally, in an embodiment, the resource request information includes a terminal device identifier.

Optionally, in an embodiment, the resource indication information received by the receiving module includes one or a combination of time domain location information, frequency domain location information, code domain location information, or pilot information used to indicate the grant-free transmission resource.

Optionally, in an embodiment, the resource indication information received by the receiving module includes one or a combination of an index of the grant-free transmission resource, an index of a time domain location of the grant-free transmission resource, an index of a frequency domain location of the grant-free transmission resource, an index of a code domain location of the grant-free transmission resource, or an index of a pilot of the grant-free transmission resource.

Optionally, in an embodiment, the frequency domain location may include a location of a sub-band occupied by the grant-free transmission resource in a frequency domain. It should be understood that the terminal device 700 according to this embodiment of the present invention may be corresponding to an execution body in the method embodiment of the present invention. In addition, both the foregoing and other operations and/or functions of the modules in the terminal device 700 are to implement corresponding processes of methods in FIG. 3 to FIG. 6. For brevity, details are not repeated herein.

Therefore, the terminal device in this embodiment of the present invention sends, to the network device, the information used to request the grant-free transmission resource, and receives the resource indication information sent by the network device. The terminal device can perform uplink data transmission on the grant-free transmission resource allocated by the network device to the terminal device. This implements contention-based uplink data transmission and improves data transmission efficiency of the system.

Figure 8:
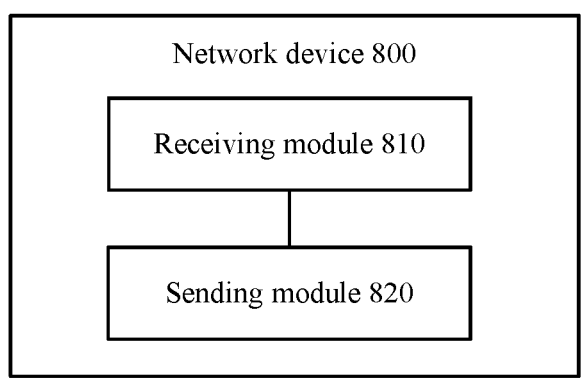
FIG. 8 is a schematic block diagram of a network device according to an embodiment of the present invention.

FIG. 8 shows the network device 800 according to an embodiment of the present invention. As shown in FIG. 8, the network device 800 includes:

a receiving module 810, configured to receive information that is used to request a grant-free transmission resource and that is sent by a terminal device; and a sending module 820, configured to send resource indication information to the terminal device, where the resource indication information is used to indicate a grant-free transmission resource that is allocated by the network device to the terminal device according to the information that is used to request the grant-free transmission resource and that is received by the receiving module 810.

Therefore, the network device in this embodiment of the present invention receives the information that is used to request the grant-free transmission resource and that is sent by the terminal device, and allocates the grant-free transmission resource to the terminal device, so that the terminal device performs uplink data transmission on the grant-free transmission resource. This implements contention-based uplink data transmission and improves data transmission efficiency of a system.

Optionally, in an embodiment, the receiving module 810 is specifically configured to receive a first random access preamble sequence sent by the terminal device, where the first random access preamble sequence belongs to a first random access preamble sequence group, the first random access preamble sequence group is used to request a grant-free transmission resource, and the first random access preamble sequence group includes at least one random access preamble sequence.

Optionally, in an embodiment, the first random access preamble sequence is a random access preamble sequence of the first random access preamble sequence group selected by the terminal device from multiple random access preamble sequence groups, where the multiple random access preamble sequence groups include at least the first random access preamble sequence group and a second random access preamble sequence group, and the second random access preamble sequence group is used to request a granted transmission resource.

Optionally, in an embodiment, the first random access preamble sequence group includes M first random access preamble sequence subgroups, and the M first random access preamble sequence subgroups are obtained by dividing according to a transmission characteristic.

Optionally, in an embodiment, the receiving module 810 is specifically configured to receive a random access preamble sequence sent by the terminal device on a first random access channel, where the first random access channel belongs to a first random access channel group, the first random access channel group is used to request a grant-free transmission resource, and the first random access channel group includes at least one random access channel.

Optionally, in an embodiment, the first random access channel is a random access channel of the first random access channel group selected by the terminal device from multiple random access channel groups, where the multiple random access channel groups include at least the first random access channel group and a second random access channel group, and the second random access channel group is used to request a granted transmission resource.

Optionally, in an embodiment, the first random access channel group includes N random access channel subgroups, and the N random access channel subgroups are obtained by dividing according to a transmission characteristic.

Optionally, in an embodiment, the receiving module 810 is specifically configured to receive a first random access preamble sequence sent by the terminal device on a first random access channel, where a combination of the first random access channel and the first random access preamble sequence belongs to a first combination set, the first combination set is used to request a grant-free transmission resource, and the first combination set includes at least one combination of a random access channel and a random access preamble sequence.

Optionally, in an embodiment, the combination of the first random access channel and the first random access preamble sequence is a combination of a random access channel and a random access preamble sequence in the first combination set that is selected by the terminal device from multiple combination sets, where the multiple combination sets include at least the first combination set and a second combination set, and the second combination set is used to request a granted transmission resource.

Optionally, in an embodiment, the first combination set includes K combination subsets, and the K combination subsets are obtained by dividing according to a transmission characteristic.

Optionally, in an embodiment, the transmission characteristic includes one or more of a latency characteristic, a power consumption characteristic, or a transmission time interval (TTI) length characteristic.

Optionally, in an embodiment, the receiving module 810 is specifically configured to receive resource request information that is used to request the grant-free transmission resource and that is sent by the terminal device to the network device by using radio resource control (RRC) signaling.

Optionally, in an embodiment, the receiving module 810 is specifically configured to receive resource request information that is used to request the grant-free transmission resource and that is sent by the terminal device to the network device by using Media Access Control (MAC) signaling.

Optionally, in an embodiment, the resource request information includes transmission characteristic information, where the transmission characteristic information is used to indicate a transmission characteristic of the grant-free transmission resource of the terminal device.

Optionally, in an embodiment, the transmission characteristic information includes at least one of latency characteristic information, power consumption characteristic information, or transmission time interval (TTI) characteristic information.

Optionally, in an embodiment, the resource request information includes a terminal device identifier, and the network device 800 further includes a processing module, configured to allocate different grant-free transmission resources to different terminal devices according to the terminal device identifier.

Optionally, in an embodiment, the resource indication information sent by the sending module 820 includes one or a combination of time domain location information, frequency domain location information, code domain location information, or pilot information used to indicate the grant-free transmission resource.

Optionally, in an embodiment, the resource indication information sent by the sending module 820 includes one or a combination of an index of the grant-free transmission resource, an index of a time domain location of the grant-free transmission resource, an index of a frequency domain location of the grant-free transmission resource, an index of a code domain location of the grant-free transmission resource, or an index of a pilot of the grant-free transmission resource.

Optionally, in an embodiment, the frequency domain location may include a location of a sub-band occupied by the grant-free transmission resource in a frequency domain.

It should be understood that the network device 800 according to this embodiment of the present invention may be corresponding to an execution body in the method embodiment of the present invention. In addition, both the foregoing and other operations and/or functions of the modules in the network device 800 are to implement corresponding processes of methods in FIG. 3 to FIG. 6. For brevity, details are not repeated herein.

Therefore, the network device in this embodiment of the present invention receives the information that is used to request the grant-free transmission resource and that is sent by the terminal device, and allocates the grant-free transmission resource to the terminal device, so that the terminal device performs uplink data transmission on the grant-free transmission resource. This implements contention-based uplink data transmission and improves data transmission efficiency of the system.

Figure 9:
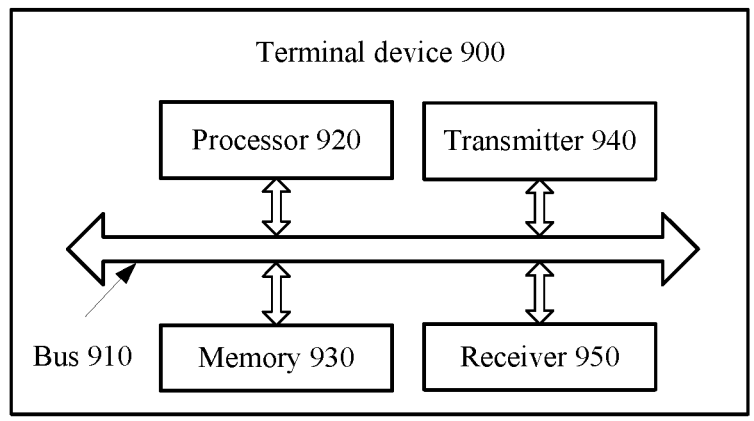
FIG. 9 is a schematic block diagram of a terminal device according to another embodiment of the present invention.

As shown in FIG. 9, an embodiment of the present invention provides a terminal device 900. The terminal device 900 includes a processor 920, a memory 930, a transmitter 940, and a receiver 950. Optionally, the terminal device 900 may further include a bus 910. The processor 920, the memory 930, the transmitter 940, and the receiver 950 are connected by using the bus 910. The transmitter 940 invokes, by using the bus 910, a program stored in the memory 930, so as to send, to a network device, information used to request a grant-free transmission resource. The receiver 950 invokes, by using the bus 910, a program stored in the memory 930, so as to receive resource indication information sent by the network device, where the resource indication information is used to indicate a grant-free transmission resource that is allocated by the network device to the terminal device 900 according to the information that is used to request the grant-free transmission resource and that is sent by the transmitter 940. The processor 920 invokes, by using the bus 910, a program stored in the memory 930, so as to determine, according to the resource indication information received by the receiver 950, the transmission resource used for performing grant-free transmission.

Therefore, the terminal device in this embodiment of the present invention sends, to the network device, the information used to request the grant-free transmission resource, and receives the resource indication information sent by the network device. The terminal device can perform uplink data transmission on the grant-free transmission resource allocated by the network device to the terminal device. This implements contention-based uplink data transmission and improves data transmission efficiency of a system.

It should be understood that in this embodiment of the present invention, the processor 920 may be a central processing unit (Central Processing Unit, CPU). The processor 920 may alternatively be another general purpose processor, a digital signal processor (Digital Signal Processor, DSP), an application-specific integrated circuit (Application Specific Integrated Circuit, ASIC), a field-programmable gate array (Field-Programmable Gate Array, FPGA) or another programmable logic device, a discrete gate or transistor logic device, a discrete hardware component, or the like. The general purpose processor may be a microprocessor, the processor may be any conventional processor, or the like.

The memory 930 may include a read-only memory and a random access memory, and provide an instruction and data for the processor 920. A part of the memory 930 may further include a non-volatile random access memory. For example, the memory 930 may further store device type information.

The bus 910 may further include a power bus, a control bus, a status signal bus, or the like in addition to a data bus. However, for the sake of clarity, various types of buses are marked as the bus 910 in the figure.

In an implementation process, steps in the foregoing method may be implemented by using an integrated hardware logic circuit in the processor 920 or an instruction in a form of software. The steps in the method disclosed with reference to the embodiment of the present invention may be directly implemented by a hardware processor or be implemented by using a combination of hardware in a processor and a software module. The software module may be located in a random access memory, a flash memory, a read-only memory, a programmable read-only memory or an electrically erasable programmable memory, a register, or another mature storage medium in the art. The storage medium is located in the memory 930. The processor 920 reads information from the memory 930 and implements the steps in the foregoing method by using hardware in the processor 920. To avoid repetition, details are not repeated herein.

Optionally, in an embodiment, the transmitter 940 is specifically configured to send a first random access preamble sequence, to request the grant-free transmission resource from the network device, where the first random access preamble sequence belongs to a first random access preamble sequence group, the first random access preamble sequence group is used to request a grant-free transmission resource, and the first random access preamble sequence group includes at least one random access preamble sequence.

Optionally, in an embodiment, the processor 910 is further configured to: before the transmitter module sends the first random access preamble sequence, to request the grant-free transmission resource from the network device, select the first random access preamble sequence of the first random access preamble sequence group from multiple random access preamble sequence groups, where the multiple random access preamble sequence groups include at least the first random access preamble sequence group and a second random access preamble sequence group, and the second random access preamble sequence group is used to request a granted transmission resource.

Optionally, in an embodiment, the first random access preamble sequence group includes M first random access preamble sequence subgroups, and the M first random access preamble sequence subgroups are obtained by dividing according to a transmission characteristic.

Optionally, in an embodiment, the transmitter 940 is specifically configured to send a random access preamble sequence on a first random access channel, to request the grant-free transmission resource from the network device, where the first random access channel belongs to a first random access channel group, the first random access channel group is used to request a grant-free transmission resource, and the first random access channel group includes at least one random access channel.

Optionally, in an embodiment, the processor 910 is further configured to: before the transmitter sends the random access preamble sequence on the first random access channel, select the first random access channel of the first random access channel group from multiple random access channel groups, where the multiple random access channel groups include at least the first random access channel group and a second random access channel group, and the second random access channel group is used to request a granted transmission resource.

Optionally, in an embodiment, the first random access channel group includes N random access channel subgroups, and the N random access channel subgroups are obtained by dividing according to a transmission characteristic.

Optionally, in an embodiment, the generator 940 is specifically configured to send a first random access preamble sequence on a first random access channel, to request the grant-free transmission resource from the network device, where a combination of the first random access channel and the first random access preamble sequence belongs to a first combination set, the first combination set is used to request a grant-free transmission resource, and the first combination set includes at least one combination of a random access channel and a random access preamble sequence.

Optionally, in an embodiment, the processor 910 is further configured to: before the transmitter sends the first random access preamble sequence on the first random access channel, select the combination of the first random access channel and the first random access preamble sequence from multiple combination sets, where the combination is in the first combination set, the multiple combination sets include at least the first combination set and a second combination set, and the second combination set is used to request a granted transmission resource.

Optionally, in an embodiment, the first combination set includes K combination subsets, and the K combination subsets are obtained by dividing according to a transmission characteristic.

Optionally, in an embodiment, the transmission characteristic includes one or more of a latency characteristic, a power consumption characteristic, or a transmission time interval (TTI) length characteristic.

Optionally, in an embodiment, the transmitter 940 is specifically configured to send, to the network device by using radio resource control (RRC) signaling, resource request information used to request the grant-free transmission resource.

Optionally, in an embodiment, the transmitter 940 is specifically configured to send, to the network device by using Media Access Control (MAC) signaling, resource request information used to request the grant-free transmission resource.

Optionally, in an embodiment, the resource request information includes transmission characteristic information, where the transmission characteristic information is used to indicate a transmission characteristic of the grant-free transmission resource of the terminal device.

Optionally, in an embodiment, the transmission characteristic information includes at least one of latency characteristic information, power consumption characteristic information, or transmission time interval (TTI) characteristic information.

Optionally, in an embodiment, the resource request information includes a terminal device identifier.

Optionally, in an embodiment, the resource indication information received by the receiver 950 includes one or a combination of time domain location information, frequency domain location information, code domain location information, or pilot information used to indicate the grant-free transmission resource.

Optionally, in an embodiment, the resource indication information received by the receiver 950 includes one or a combination of an index of the grant-free transmission resource, an index of a time domain location of the grant-free transmission resource, an index of a frequency domain location of the grant-free transmission resource, an index of a code domain location of the grant-free transmission resource, or an index of a pilot of the grant-free transmission resource.

Optionally, in an embodiment, the frequency domain location may include a location of a sub-band occupied by the grant-free transmission resource in a frequency domain.

It should be understood that the terminal device 900 according to this embodiment of the present invention may be corresponding to an entity executing the method in the embodiment of the present invention, or may be corresponding to the terminal device 700 according to the embodiment of the present invention. In addition, both the foregoing and other operations and/or functions of the modules in the terminal device 900 are to implement corresponding processes of methods in FIG. 3 to FIG. 6. For brevity, details are not repeated herein.

Therefore, the terminal device in this embodiment of the present invention sends, to the network device, the information used to request the grant-free transmission resource, and receives the resource indication information sent by the network device. The terminal device can perform uplink data transmission on the grant-free transmission resource allocated by the network device to the terminal device. This implements contention-based uplink data transmission and improves data transmission efficiency of the system.

Figure 10:
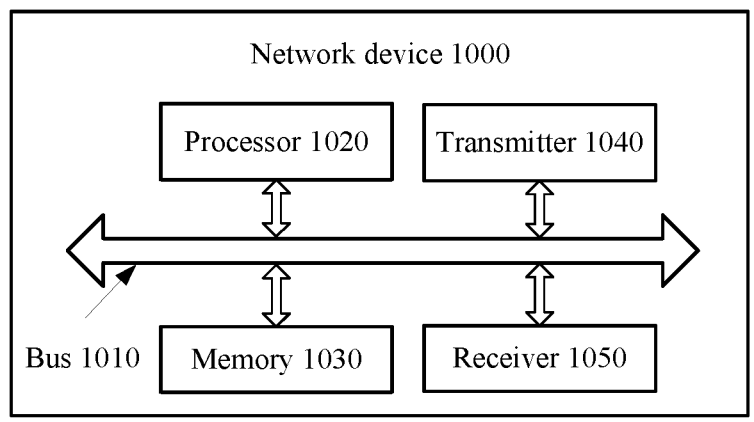
FIG. 10 is a schematic block diagram of a network device according to another embodiment of the present invention.

As shown in FIG. 10, an embodiment of the present invention provides a network device 1000. The network device 1000 includes a transmitter 1040 and a receiver 1050. Optionally, the network device 1000 may further include a bus 1010, a processor 1020, and a memory 1030. The processor 1020, the memory 1030, the transmitter 1040, and the receiver 1050 are connected by using the bus 1010. The receiver 1050 invokes, by using the bus 1010, a program stored in the memory 1030, so as to receive information that is used to request a grant-free transmission resource and that is sent by a terminal device. The transmitter 1040 invokes, by using the bus 1010, a program stored in the memory 1030, so as to send resource indication information to the terminal device, where the resource indication information is used to indicate a grant-free transmission resource that is allocated by the network device 1000 to the terminal device according to the information that is used to request the grant-free transmission resource and that is received by the receiver 1050.

Therefore, the network device in this embodiment of the present invention receives the information that is used to request the grant-free transmission resource and that is sent by the terminal device, and allocates the grant-free transmission resource to the terminal device, so that the terminal device performs uplink data transmission on the grant-free transmission resource. This implements contention-based uplink data transmission and improves data transmission efficiency of a system.

It should be understood that in this embodiment of the present invention, the processor 1020 may be a central processing unit (Central Processing Unit, CPU). The processor 1020 may alternatively be another general purpose processor, a digital signal processor (Digital Signal Processor, DSP), an application-specific integrated circuit (Application Specific Integrated Circuit, ASIC), a field-programmable gate array (Field-Programmable Gate Array, FPGA) or another programmable logic device, a discrete gate or transistor logic device, a discrete hardware component, or the like. The general purpose processor may be a microprocessor, the processor may be any conventional processor, or the like.

The memory 1030 may include a read-only memory and a random access memory, and provide an instruction and data for the processor 1020. A part of the memory 1030 may further include a non-volatile random access memory. For example, the memory 1030 may further store device type information.

The bus 1010 may further include a power bus, a control bus, a status signal bus, or the like in addition to a data bus. However, for clear description, various types of buses are marked as the bus 1010 in the figure.

In an implementation process, steps in the foregoing method may be implemented by using an integrated hardware logic circuit in the processor 1020 or an instruction in a form of software. The steps in the method disclosed with reference to the embodiment of the present invention may be directly implemented by a hardware processor or be implemented by using a combination of hardware in a processor and a software module. The software module may be located in a random access memory, a flash memory, a read-only memory, a programmable read-only memory or an electrically erasable programmable memory, a register, or another mature storage medium in the art. The storage medium is located in the memory 1030. The processor 1020 reads information from the memory 1030 and implements the steps in the foregoing method by using hardware in the processor 1020. To avoid repetition, details are not repeated herein.

Optionally, in an embodiment, the receiver 1050 is specifically configured to receive a first random access preamble sequence sent by the terminal device, where the first random access preamble sequence belongs to a first random access preamble sequence group, the first random access preamble sequence group is used to request a grant-free transmission resource, and the first random access preamble sequence group includes at least one random access preamble sequence.

Optionally, in an embodiment, the first random access preamble sequence is a random access preamble sequence of the first random access preamble sequence group selected by the terminal device from multiple random access preamble sequence groups, where the multiple random access preamble sequence groups include at least the first random access preamble sequence group and a second random access preamble sequence group, and the second random access preamble sequence group is used to request a granted transmission resource.

Optionally, in an embodiment, the first random access preamble sequence group includes M first random access preamble sequence subgroups, and the M first random access preamble sequence subgroups are obtained by dividing according to a transmission characteristic.

Optionally, in an embodiment, the receiver 1050 is specifically configured to receive a random access preamble sequence sent by the terminal device on a first random access channel, where the first random access channel belongs to a first random access channel group, the first random access channel group is used to request a grant-free transmission resource, and the first random access channel group includes at least one random access channel.

Optionally, in an embodiment, the first random access channel is a random access channel of the first random access channel group selected by the terminal device from multiple random access channel groups, where the multiple random access channel groups include at least the first random access channel group and a second random access channel group, and the second random access channel group is used to request a granted transmission resource.

Optionally, in an embodiment, the first random access channel group includes N random access channel subgroups, and the N random access channel subgroups are obtained by dividing according to a transmission characteristic.

Optionally, in an embodiment, the receiver 1050 is specifically configured to receive a first random access preamble sequence sent by the terminal device on a first random access channel, where a combination of the first random access channel and the first random access preamble sequence belongs to a first combination set, the first combination set is used to request a grant-free transmission resource, and the first combination set includes at least one combination of a random access channel and a random access preamble sequence.

Optionally, in an embodiment, the combination of the first random access channel and the first random access preamble sequence is a combination of a random access channel and a random access preamble sequence in the first combination set that is selected by the terminal device from multiple combination sets, where the multiple combination sets include at least the first combination set and a second combination set, and the second combination set is used to request a granted transmission resource.

Optionally, in an embodiment, the first combination set includes K combination subsets, and the K combination subsets are obtained by dividing according to a transmission characteristic.

Optionally, in an embodiment, the transmission characteristic includes one or more of a latency characteristic, a power consumption characteristic, or a transmission time interval (TTI) length characteristic.

Optionally, in an embodiment, the receiver 1050 is specifically configured to receive resource request information that is used to request the grant-free transmission resource and that is sent by the terminal device to the network device by using radio resource control (RRC) signaling.

Optionally, in an embodiment, the receiver 1050 is specifically configured to receive resource request information that is used to request the grant-free transmission resource and that is sent by the terminal device to the network device by using Media Access Control (MAC) signaling.

Optionally, in an embodiment, the resource request information includes transmission characteristic information, where the transmission characteristic information is used to indicate a transmission characteristic of the grant-free transmission resource of the terminal device.

Optionally, in an embodiment, the transmission characteristic information includes at least one of latency characteristic information, power consumption characteristic information, or transmission time interval (TTI) characteristic information.

Optionally, in an embodiment, the resource request information includes a terminal device identifier, and the processor 1010 is further configured to allocate different grant-free transmission resources to different terminal devices according to the terminal device identifier.

Optionally, in an embodiment, the resource indication information sent by the transmitter 1040 includes one or a combination of time domain location information, frequency domain location information, code domain location information, or pilot information used to indicate the grant-free transmission resource.

Optionally, in an embodiment, the resource indication information sent by the transmitter 1040 includes one or a combination of an index of the grant-free transmission resource, an index of a time domain location of the grant-free transmission resource, an index of a frequency domain location of the grant-free transmission resource, an index of a code domain location of the grant-free transmission resource, or an index of a pilot of the grant-free transmission resource.

Optionally, in an embodiment, the frequency domain location may include a location of a sub-band occupied by the grant-free transmission resource in a frequency domain.

It should be understood that the network device 1000 according to this embodiment of the present invention may be corresponding to an entity executing the method in the embodiment of the present invention, or may be corresponding to the network device 800 according to the embodiment of the present invention. In addition, both the foregoing and other operations and/or functions of the modules in the network device 1000 are to implement corresponding processes of methods in FIG. 3 to FIG. 6. For brevity, details are not repeated herein.

Therefore, the network device in this embodiment of the present invention receives the information that is used to request the grant-free transmission resource and that is sent by the terminal device, and allocates the grant-free transmission resource to the terminal device, so that the terminal device performs uplink data transmission on the grant-free transmission resource. This implements contention-based uplink data transmission and improves data transmission efficiency of the system.

It should be understood that, in the embodiments of the present invention, preferably, the terminal device is user equipment, and the network device is a base station.

It should be understood that the sending module or the transmitter in the foregoing embodiments may send data over an air interface, or may not send data over an air interface, but may send data to another device so that the another device sends the data over the air interface. The receiving module or the receiver in the foregoing embodiments may receive data over an air interface, or may not receive data over an air interface, but may receive data from another device that receives the data over the air interface.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not repeated herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

To make the application file concise and clear, technical features and descriptions in one of the foregoing embodiments may be understood as being applicable to the other embodiments, and details are not repeated in the other embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, a network device, or the like) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

To make the application file concise and clear, technical features and descriptions in one of the foregoing embodiments may be understood as being applicable to the other embodiment. For example, technical features of a method embodiment may be applicable to the apparatus embodiment or the other method embodiments, and details are not repeated in the other embodiments.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

Further embodiments of the present invention are provided in the following. It should be noted that the numbering used in the following section does not necessarily need to comply with the numbering used in the previous sections. The numbering of following embodiments may not be consecutive.

Embodiment 1

An uplink data transmission method, comprising:
sending, by a terminal device to a network device, information used to request a grant-free transmission resource;
receiving, by the terminal device, resource indication information sent by the network device, wherein the resource indication information is used to indicate a grant-free transmission resource that is allocated by the network device to the terminal device according to the information used to request the grant-free transmission resource; and
determining, by the terminal device according to the resource indication information, the transmission resource used for performing grant-free transmission.

Embodiment 2

The method according to embodiment 1, wherein the sending, by a terminal device to a network device, information used to request a grant-free transmission resource comprises:
sending, by the terminal device, a first random access preamble sequence, to request the grant-free transmission resource from the network device, wherein the first random access preamble sequence belongs to a first random access preamble sequence group, the first random access preamble sequence group is used to request a grant-free transmission resource, and the first random access preamble sequence group comprises at least one random access preamble sequence.

Embodiment 3

The method according to embodiment 2, wherein before the sending, by the terminal device, a first random access preamble sequence, to request the grant-free transmission resource from the network device, the method further comprises:
selecting, by the terminal device, the first random access preamble sequence of the first random access preamble sequence group from multiple random access preamble sequence groups, wherein the multiple random access preamble sequence groups comprise at least the first random access preamble sequence group and a second random access preamble sequence group, and the second random access preamble sequence group is used to request a granted transmission resource.

Embodiment 4

The method according to embodiment 2 or 3, wherein the first random access preamble sequence group comprises M first random access preamble sequence subgroups, and the M first random access preamble sequence subgroups are obtained by dividing according to a transmission characteristic.

Embodiment 5

The method according to embodiment 1, wherein the sending, by a terminal device to a network device, information used to request a grant-free transmission resource comprises:
sending, by the terminal device, a random access preamble sequence on a first random access channel, to request the grant-free transmission resource from the network device, wherein the first random access channel belongs to a first random access channel group, the first random access channel group is used to request a grant-free transmission resource, and the first random access channel group comprises at least one random access channel.

Embodiment 6

The method according to embodiment 5, wherein before the sending, by the terminal device, a random access preamble sequence on a first random access channel, the method further comprises:
selecting, by the terminal device, the first random access channel of the first random access channel group from multiple random access channel groups, wherein the multiple random access channel groups comprise at least the first random access channel group and a second random access channel group, and the second random access channel group is used to request a granted transmission resource.

Embodiment 7

The method according to embodiment 5 or 6, wherein the first random access channel group comprises N random access channel subgroups, and the N random access channel subgroups are obtained by dividing according to a transmission characteristic.

Embodiment 8

The method according to embodiment 1, wherein the sending, by a terminal device to a network device, information used to request a grant-free transmission resource comprises:
sending, by the terminal device, a first random access preamble sequence on a first random access channel, to request the grant-free transmission resource from the network device, wherein a combination of the first random access channel and the first random access preamble sequence belongs to a first combination set, the first combination set is used to request a grant-free transmission resource, and the first combination set comprises at least one combination of a random access channel and a random access preamble sequence.

Embodiment 9

The method according to embodiment 8, wherein before the sending, by the terminal device, a first random access preamble sequence on a first random access channel, the method further comprises:
selecting, by the terminal device, the combination of the first random access channel and the first random access preamble sequence from multiple combination sets, wherein the combination is in the first combination set, the multiple combination sets comprise at least the first combination set and a second combination set, and the second combination set is used to request a granted transmission resource.

Embodiment 10

The method according to embodiment 8 or 9, wherein the first combination set comprises K combination subsets, and the K combination subsets are obtained by dividing according to a transmission characteristic.

Embodiment 11

The method according to any one of embodiment 4, 7, or 10, wherein the transmission characteristic comprises one or more of a latency characteristic, a power consumption characteristic, or a transmission time interval (TTI) length characteristic.

Embodiment 12

The method according to embodiment 1, wherein the sending, by a terminal device to a network device, information used to request a grant-free transmission resource comprises:
sending, by the terminal device to the network device by using radio resource control (RRC) signaling, resource request information used to request the grant-free transmission resource.

Embodiment 13

The method according to embodiment 1, wherein the sending, by a terminal device to a network device, information used to request a grant-free transmission resource comprises:
sending, by the terminal device to the network device by using Media Access Control (MAC) signaling, resource request information used to request the grant-free transmission resource.

Embodiment 14

The method according to embodiment 12 or 13, wherein the resource request information comprises transmission characteristic information, wherein the transmission characteristic information is used to indicate a transmission characteristic of the grant-free transmission resource of the terminal device.

Embodiment 15

The method according to embodiment 14, wherein the transmission characteristic information comprises at least one of latency characteristic information, power consumption characteristic information, or transmission time interval (TTI) characteristic information.

Embodiment 16

The method according to any one of embodiments 12 to 15, wherein the resource request information comprises a terminal device identifier.

Embodiment 17

The method according to any one of embodiments 1 to 16, wherein the resource indication information comprises one or a combination of time domain location information, frequency domain location information, code domain location information, or pilot information used to indicate the grant-free transmission resource.

Embodiment 18

The method according to any one of embodiments 1 to 17, wherein the resource indication information comprises one or a combination of an index of the grant-free transmission resource, an index of a time domain location of the grant-free transmission resource, an index of a frequency domain location of the grant-free transmission resource, an index of a code domain location of the grant-free transmission resource, or an index of a pilot of the grant-free transmission resource.

Embodiment 19

The method according to embodiment 17 or 18, wherein the frequency domain location comprises a location of a sub-band occupied by the grant-free transmission resource in a frequency domain.

Embodiment 20

An uplink data transmission method, comprising:
receiving, by a network device, information that is used to request a grant-free transmission resource and that is sent by a terminal device; and
sending, by the network device, resource indication information to the terminal device, wherein the resource indication information is used to indicate a grant-free transmission resource that is allocated by the network device to the terminal device according to the information used to request the grant-free transmission resource.

Embodiment 21

The method according to embodiment 20, wherein the receiving, by a network device, information that is used to request a grant-free transmission resource and that is sent by a terminal device comprises:
receiving, by the network device, a first random access preamble sequence sent by the terminal device, wherein the first random access preamble sequence belongs to a first random access preamble sequence group, the first random access preamble sequence group is used to request a grant-free transmission resource, and the first random access preamble sequence group comprises at least one random access preamble sequence.

Embodiment 22

The method according to embodiment 21, wherein the first random access preamble sequence is a random access preamble sequence of the first random access preamble sequence group selected by the terminal device from multiple random access preamble sequence groups, wherein the multiple random access preamble sequence groups comprise at least the first random access preamble sequence group and a second random access preamble sequence group, and the second random access preamble sequence group is used to request a granted transmission resource.

Embodiment 23

The method according to embodiment 21 or 22, wherein the first random access preamble sequence group comprises M first random access preamble sequence subgroups, and the M first random access preamble sequence subgroups are obtained by dividing according to a transmission characteristic.

Embodiment 24

The method according to embodiment 20, wherein the receiving, by a network device, information that is used to request a grant-free transmission resource and that is sent by a terminal device comprises:
receiving, by the network device, a random access preamble sequence sent by the terminal device on a first random access channel, wherein the first random access channel belongs to a first random access channel group, the first random access channel group is used to request a grant-free transmission resource, and the first random access channel group comprises at least one random access channel.

Embodiment 25

The method according to embodiment 24, wherein the first random access channel is a random access channel of the first random access channel group selected by the terminal device from multiple random access channel groups, wherein the multiple random access channel groups comprise at least the first random access channel group and a second random access channel group, and the second random access channel group is used to request a granted transmission resource.

Embodiment 26

The method according to embodiment 24 or 25, wherein the first random access channel group comprises N random access channel subgroups, and the N random access channel subgroups are obtained by dividing according to a transmission characteristic.

Embodiment 27

The method according to embodiment 20, wherein the receiving, by a network device, information that is used to request a grant-free transmission resource and that is sent by a terminal device comprises:
receiving, by the network device, a first random access preamble sequence sent by the terminal device on a first random access channel, wherein a combination of the first random access channel and the first random access preamble sequence belongs to a first combination set, the first combination set is used to request a grant-free transmission resource, and the first combination set comprises at least one combination of a random access channel and a random access preamble sequence.

Embodiment 28

The method according to embodiment 27, wherein the combination of the first random access channel and the first random access preamble sequence is a combination of a random access channel and a random access preamble sequence in the first combination set that is selected by the terminal device from multiple combination sets, wherein the multiple combination sets comprise at least the first combination set and a second combination set, and the second combination set is used to request a granted transmission resource.

Embodiment 29

The method according to embodiment 27 or 28, wherein the first combination set comprises K combination subsets, and the K combination subsets are obtained by dividing according to a transmission characteristic.

Embodiment 30

The method according to any one of embodiment 23, 26, or 29, wherein the transmission characteristic comprises one or more of a latency characteristic, a power consumption characteristic, or a transmission time interval (TTI) length characteristic.

Embodiment 31

The method according to embodiment 20, wherein the receiving, by a network device, information that is used to request a grant-free transmission resource and that is sent by a terminal device comprises:

receiving, by the network device, resource request information that is used to request the grant-free transmission resource and that is sent by the terminal device to the network device by using radio resource control (RRC) signaling.

Embodiment 32

The method according to embodiment 20, wherein the receiving, by a network device, information that is used to request a grant-free transmission resource and that is sent by a terminal device comprises:

receiving, by the network device, resource request information that is used to request the grant-free transmission resource and that is sent by the terminal device to the network device by using Media Access Control (MAC) signaling.

Embodiment 33

The method according to embodiment 31 or 32, wherein the resource request information comprises transmission characteristic information, wherein the transmission characteristic information is used to indicate a transmission characteristic of the grant-free transmission resource of the terminal device.

Embodiment 34

The method according to embodiment 33, wherein the transmission characteristic information comprises at least one of latency characteristic information, power consumption characteristic information, or transmission time interval (TTI) characteristic information.

Embodiment 35

The method according to any one of embodiments 31 to 34, wherein the resource request information comprises a terminal device identifier, and the method further comprises:

allocating, by the network device, different grant-free transmission resources to different terminal devices according to the terminal device identifier.

Embodiment 36

The method according to any one of embodiments 20 to 35, wherein the resource indication information comprises one or a combination of time domain location information, frequency domain location information, code domain location information, or pilot information used to indicate the grant-free transmission resource.

Embodiment 37

The method according to any one of embodiments 20 to 36, wherein the resource indication information comprises one or a combination of an index of the grant-free transmission resource, an index of a time domain location of the grant-free transmission resource, an index of a frequency domain location of the grant-free transmission resource, an index of a code domain location of the grant-free transmission resource, or an index of a pilot of the grant-free transmission resource.

Embodiment 38

The method according to embodiment 36 or 37, wherein the frequency domain location comprises a location of a sub-band occupied by the grant-free transmission resource in a frequency domain.

Embodiment 39

A terminal device, comprising:
a sending module, configured to send, to a network device, information used to request a grant-free transmission resource;
a receiving module, configured to receive resource indication information sent by the network device, wherein the resource indication information is used to indicate a grant-free transmission resource that is allocated by the network device to the terminal device according to the information that is used to request the grant-free transmission resource and that is sent by the sending module; and
a determining module, configured to determine, according to the resource indication information received by the receiving module, the transmission resource used for performing grant-free transmission.

Embodiment 40

The terminal device according to embodiment 39, wherein the sending module is specifically configured to:
send a first random access preamble sequence, to request the grant-free transmission resource from the network device, wherein the first random access preamble sequence belongs to a first random access preamble sequence group, the first random access preamble sequence group is used to request a grant-free transmission resource, and the first random access preamble sequence group comprises at least one random access preamble sequence.

Embodiment 41

The terminal device according to embodiment 40, wherein the terminal device further comprises:
a selection module, configured to: before the sending module sends the first random access preamble sequence, to request the grant-free transmission resource from the network device, select the first random access preamble sequence of the first random access preamble sequence group from multiple random access preamble sequence groups, wherein the multiple random access preamble sequence groups comprise at least the first random access preamble sequence group and a second random access preamble sequence group, and the second random access preamble sequence group is used to request a granted transmission resource.

Embodiment 42

The terminal device according to embodiment 40 or 41, wherein the first random access preamble sequence group comprises M first random access preamble sequence subgroups, and the M first random access preamble sequence subgroups are obtained by dividing according to a transmission characteristic.

Embodiment 43

The terminal device according to embodiment 39, wherein the sending module is specifically configured to:

send a random access preamble sequence on a first random access channel, to request the grant-free transmission resource from the network device, wherein the first random access channel belongs to a first random access channel group, the first random access channel group is used to request a grant-free transmission resource, and the first random access channel group comprises at least one random access channel.

Embodiment 44

The terminal device according to embodiment 43, wherein the terminal device further comprises:
a selection module, configured to: before the sending module sends the random access preamble sequence on the first random access channel, select the first random access channel of the first random access channel group from multiple random access channel groups, wherein the multiple random access channel groups comprise at least the first random access channel group and a second random access channel group, and the second random access channel group is used to request a granted transmission resource.

Embodiment 45

The terminal device according to embodiment 43 or 44, wherein the first random access channel group comprises N random access channel subgroups, and the N random access channel subgroups are obtained by dividing according to a transmission characteristic.

Embodiment 46

The terminal device according to embodiment 39, wherein the sending module is specifically configured to:
send a first random access preamble sequence on a first random access channel, to request the grant-free transmission resource from the network device, wherein a combination of the first random access channel and the first random access preamble sequence belongs to a first combination set, the first combination set is used to request a grant-free transmission resource, and the first combination set comprises at least one combination of a random access channel and a random access preamble sequence.

Embodiment 47

The terminal device according to embodiment 46, wherein the terminal device further comprises:
a selection module, configured to: before the sending module sends the first random access preamble sequence on the first random access channel, select the combination of the first random access channel and the first random access preamble sequence from multiple combination sets, wherein the combination is in the first combination set, the multiple combination sets comprise at least the first combination set and a second combination set, and the second combination set is used to request a granted transmission resource.

Embodiment 48

The terminal device according to embodiment 46 or 47, wherein the first combination set comprises K combination subsets, and the K combination subsets are obtained by dividing according to a transmission characteristic.

Embodiment 49

The terminal device according to any one of embodiment 42, 45, or 48, wherein the transmission characteristic comprises one or more of a latency characteristic, a power consumption characteristic, or a transmission time interval (TTI) length characteristic.

Embodiment 50

The terminal device according to embodiment 39, wherein the sending module is specifically configured to:
send, to the network device by using radio resource control (RRC) signaling, resource request information used to request the grant-free transmission resource.

Embodiment 51

The terminal device according to embodiment 39, wherein the sending module is specifically configured to:
send, to the network device by using Media Access Control (MAC) signaling, resource request information used to request the grant-free transmission resource.

Embodiment 52

The terminal device according to embodiment 50 or 51, wherein the resource request information comprises transmission characteristic information, wherein the transmission characteristic information is used to indicate a transmission characteristic of the grant-free transmission resource of the terminal device.

Embodiment 53

The terminal device according to embodiment 52, wherein the transmission characteristic information comprises at least one of latency characteristic information, power consumption characteristic information, or transmission time interval (TTI) characteristic information.

Embodiment 54

The terminal device according to any one of embodiments 50 to 53, wherein the resource request information comprises a terminal device identifier.

Embodiment 55

The terminal device according to any one of embodiments 39 to 54, wherein the resource indication information received by the receiving module comprises one or a combination of time domain location information, frequency domain location information, code domain location information, or pilot information used to indicate the grant-free transmission resource.

Embodiment 56

The terminal device according to any one of embodiments 39 to 55, wherein the resource indication information received by the receiving module comprises one or a combination of an index of the grant-free transmission resource, an index of a time domain location of the grant-free transmission resource, an index of a frequency domain location of the grant-free transmission resource, an index of a code domain location of the grant-free transmission resource, or an index of a pilot of the grant-free transmission resource.

Embodiment 57

The terminal device according to embodiment 55 or 56, wherein the frequency domain location comprises a location of a sub-band occupied by the grant-free transmission resource in a frequency domain.

Embodiment 58

A network device, comprising:
a receiving module, configured to receive information that is used to request a grant-free transmission resource and that is sent by a terminal device; and
a sending module, configured to send resource indication information to the terminal device, wherein the resource indication information is used to indicate a grant-free transmission resource that is allocated by the network device to the terminal device according to the information that is used to request the grant-free transmission resource and that is received by the receiving module.

Embodiment 59

The network device according to embodiment 58, wherein the receiving module is specifically configured to:
receive a first random access preamble sequence sent by the terminal device, wherein the first random access preamble sequence belongs to a first random access preamble sequence group, the first random access preamble sequence group is used to request a grant-free transmission resource, and the first random access preamble sequence group comprises at least one random access preamble sequence.

Embodiment 60

The network device according to embodiment 59, wherein the first random access preamble sequence is a random access preamble sequence of the first random access preamble sequence group selected by the terminal device from multiple random access preamble sequence groups, wherein the multiple random access preamble sequence groups comprise at least the first random access preamble sequence group and a second random access preamble sequence group, and the second random access preamble sequence group is used to request a granted transmission resource.

Embodiment 61

The network device according to embodiment 59 or 60, wherein the first random access preamble sequence group comprises M first random access preamble sequence subgroups, and the M first random access preamble sequence subgroups are obtained by dividing according to a transmission characteristic.

Embodiment 62

The network device according to embodiment 58, wherein the receiving module is specifically configured to:
receive a random access preamble sequence sent by the terminal device on a first random access channel, wherein the first random access channel belongs to a first random access channel group, the first random access channel group is used to request a grant-free transmission resource, and the first random access channel group comprises at least one random access channel.

Embodiment 63

The network device according to embodiment 62, wherein the first random access channel is a random access channel of the first random access channel group selected by the terminal device from multiple random access channel groups, wherein the multiple random access channel groups comprise at least the first random access channel group and a second random access channel group, and the second random access channel group is used to request a granted transmission resource.

Embodiment 64

The network device according to embodiment 62 or 63, wherein the first random access channel group comprises N random access channel subgroups, and the N random access channel subgroups are obtained by dividing according to a transmission characteristic.

Embodiment 65

The network device according to embodiment 58, wherein the receiving module is specifically configured to:
receive a first random access preamble sequence sent by the terminal device on a first random access channel, wherein a combination of the first random access channel and the first random access preamble sequence belongs to a first combination set, the first combination set is used to request a grant-free transmission resource, and the first combination set comprises at least one combination of a random access channel and a random access preamble sequence.

Embodiment 66

The network device according to embodiment 65, wherein the combination of the first random access channel and the first random access preamble sequence is a combination of a random access channel and a random access preamble sequence in the first combination set that is selected by the terminal device from multiple combination sets, wherein the multiple combination sets comprise at least the first combination set and a second combination set, and the second combination set is used to request a granted transmission resource.

Embodiment 67

The network device according to embodiment 65 or 66, wherein the first combination set comprises K combination subsets, and the K combination subsets are obtained by dividing according to a transmission characteristic.

Embodiment 68

The network device according to any one of embodiment 61, 64, or 67, wherein the transmission characteristic comprises one or more of a latency characteristic, a power consumption characteristic, or a transmission time interval (TTI) length characteristic.

Embodiment 69

The network device according to embodiment 58, wherein the receiving module is specifically configured to:
receive resource request information that is used to request the grant-free transmission resource and that is sent by the terminal device to the network device by using radio resource control (RRC) signaling.

Embodiment 70

The network device according to embodiment 58, wherein the receiving module is specifically configured to:
receive resource request information that is used to request the grant-free transmission resource and that is sent by the terminal device to the network device by using Media Access Control (MAC) signaling.

Embodiment 71

The network device according to embodiment 69 or 70, wherein the resource request information comprises transmission characteristic information, wherein the transmission characteristic information is used to indicate a transmission characteristic of the grant-free transmission resource of the terminal device.

Embodiment 72

The network device according to embodiment 71, wherein the transmission characteristic information comprises at least one of latency characteristic information, power consumption characteristic information, or transmission time interval (TTI) characteristic information.

Embodiment 73

The network device according to any one of embodiments 69 to 72, wherein the resource request information comprises a terminal device identifier, and the network device further comprises:
a processing module, configured to allocate different grant-free transmission resources to different terminal devices according to the terminal device identifier.

Embodiment 74

The network device according to any one of embodiments 58 to 73, wherein the resource indication information sent by the sending module comprises one or a combination of time domain location information, frequency domain location information, code domain location information, or pilot information used to indicate the grant-free transmission resource.

Embodiment 75

The network device according to any one of embodiments 58 to 74, wherein the resource indication information sent by the sending module comprises one or a combination of an index of the grant-free transmission resource, an index of a time domain location of the grant-free transmission resource, an index of a frequency domain location of the grant-free transmission resource, an index of a code domain location of the grant-free transmission resource, or an index of a pilot of the grant-free transmission resource.

Embodiment 76

The network device according to embodiment 74 or 75, wherein the frequency domain location comprises a location of a sub-band occupied by the grant-free transmission resource in a frequency domain.

Embodiment 77

A terminal device, wherein the terminal device comprises a processor, a memory, a transmitter, and a receiver, wherein the transmitter invokes a program stored in the memory, so as to send, to a network device, information used to request a grant-free transmission resource; the receiver invokes a program stored in the memory, so as to receive resource indication information sent by the network device, wherein the resource indication information is used to indicate a grant-free transmission resource that is allocated by the network device to the terminal device according to the information that is used to request the grant-free transmission resource and that is sent by the transmitter; and the processor invokes a program stored in the memory, so as to determine, according to the resource indication information received by the receiver, the transmission resource used for performing grant-free transmission.

Embodiment 78

The terminal device according to embodiment 77, wherein the transmitter is specifically configured to:
send a first random access preamble sequence, to request the grant-free transmission resource from the network device, wherein the first random access preamble sequence belongs to a first random access preamble sequence group, the first random access preamble sequence group is used to request a grant-free transmission resource, and the first random access preamble sequence group comprises at least one random access preamble sequence.

Embodiment 79

The terminal device according to embodiment 78, wherein the processor is further configured to:
before the transmitter sends the first random access preamble sequence, to request the grant-free transmission resource from the network device, select the first random access preamble sequence of the first random access preamble sequence group from multiple random access preamble sequence groups, wherein the multiple random access preamble sequence groups comprise at least the first random access preamble sequence group and a second random access preamble sequence group, and the second random access preamble sequence group is used to request a granted transmission resource.

Embodiment 80

The terminal device according to embodiment 78 or 79, wherein the first random access preamble sequence group comprises M first random access preamble sequence subgroups, and the M first random access preamble sequence subgroups are obtained by dividing according to a transmission characteristic.

Embodiment 81

The terminal device according to embodiment 77, wherein the transmitter is specifically configured to:
send a random access preamble sequence on a first random access channel, to request the grant-free transmission resource from the network device, wherein the first random access channel belongs to a first random access channel group, the first random access channel group is used to request a grant-free transmission resource, and the first random access channel group comprises at least one random access channel.

Embodiment 82

The terminal device according to embodiment 81, wherein the processor is further configured to:

before the transmitter sends the random access preamble sequence on the first random access channel, select the first random access channel of the first random access channel group from multiple random access channel groups, wherein the multiple random access channel groups comprise at least the first random access channel group and a second random access channel group, and the second random access channel group is used to request a granted transmission resource.

Embodiment 83

The terminal device according to embodiment 81 or 82, wherein the first random access channel group comprises N random access channel subgroups, and the N random access channel subgroups are obtained by dividing according to a transmission characteristic.

Embodiment 84

The terminal device according to embodiment 77, wherein the transmitter is specifically configured to:
send a first random access preamble sequence on a first random access channel, to request the grant-free transmission resource from the network device, wherein a combination of the first random access channel and the first random access preamble sequence belongs to a first combination set, the first combination set is used to request a grant-free transmission resource, and the first combination set comprises at least one combination of a random access channel and a random access preamble sequence.

Embodiment 85

The terminal device according to embodiment 84, wherein the processor is further configured to:
before the transmitter sends the first random access preamble sequence on the first random access channel, select the combination of the first random access channel and the first random access preamble sequence from multiple combination sets, wherein the combination is in the first combination set, the multiple combination sets comprise at least the first combination set and a second combination set, and the second combination set is used to request a granted transmission resource.

Embodiment 86

The terminal device according to embodiment 84 or 85, wherein the first combination set comprises K combination subsets, and the K combination subsets are obtained by dividing according to a transmission characteristic.

Embodiment 87

The terminal device according to any one of embodiment 80, 83, or 86, wherein the transmission characteristic comprises one or more of a latency characteristic, a power consumption characteristic, or a transmission time interval (TTI) length characteristic.

Embodiment 88

The terminal device according to embodiment 77, wherein the transmitter is specifically configured to:
send, to the network device by using radio resource control (RRC) signaling, resource request information used to request the grant-free transmission resource.

Embodiment 89

The terminal device according to embodiment 77, wherein the transmitter is specifically configured to:
send, to the network device by using Media Access Control (MAC) signaling, resource request information used to request the grant-free transmission resource.

Embodiment 90

The terminal device according to embodiment 88 or 89, wherein the resource request information comprises transmission characteristic information, wherein the transmission characteristic information is used to indicate a transmission characteristic of the grant-free transmission resource of the terminal device.

Embodiment 91

The terminal device according to embodiment 90, wherein the transmission characteristic information comprises at least one of latency characteristic information, power consumption characteristic information, or transmission time interval (TTI) characteristic information.

Embodiment 92

The terminal device according to any one of embodiments 88 to 91, wherein the resource request information comprises a terminal device identifier.

Embodiment 93

The terminal device according to any one of embodiments 77 to 92, wherein the resource indication information received by the receiver comprises one or a combination of time domain location information, frequency domain location information, code domain location information, or pilot information used to indicate the grant-free transmission resource.

Embodiment 94

The terminal device according to any one of embodiments 77 to 93, wherein the resource indication information received by the receiver comprises one or a combination of an index of the grant-free transmission resource, an index of a time domain location of the grant-free transmission resource, an index of a frequency domain location of the grant-free transmission resource, an index of a code domain location of the grant-free transmission resource, or an index of a pilot of the grant-free transmission resource.

Embodiment 95

The terminal device according to embodiment 93 or 94, wherein the frequency domain location comprises a location of a sub-band occupied by the grant-free transmission resource in a frequency domain.

Embodiment 96

A network device, wherein the network device comprises a transmitter and a receiver, wherein
the receiver is configured to receive information that is used to request a grant-free transmission resource and that is sent by a terminal device; the transmitter is configured to send resource indication information to the terminal device, wherein the resource indication information is used to indicate a grant-free transmission resource that is allocated by the network device to the terminal device according to the information that is used to request the grant-free transmission resource and that is received by the receiver.

Embodiment 97

The network device according to embodiment 96, wherein the receiver is specifically configured to:
receive a first random access preamble sequence sent by the terminal device, wherein the first random access preamble sequence belongs to a first random access preamble sequence group, the first random access preamble sequence group is used to request a grant-free transmission resource, and the first random access preamble sequence group comprises at least one random access preamble sequence.

Embodiment 98

The network device according to embodiment 97, wherein the first random access preamble sequence is a random access preamble sequence of the first random access preamble sequence group selected by the terminal device from multiple random access preamble sequence groups, wherein the multiple random access preamble sequence groups comprise at least the first random access preamble sequence group and a second random access preamble sequence group, and the second random access preamble sequence group is used to request a granted transmission resource.

Embodiment 99

The network device according to embodiment 97 or 98, wherein the first random access preamble sequence group comprises M first random access preamble sequence subgroups, and the M first random access preamble sequence subgroups are obtained by dividing according to a transmission characteristic.

Embodiment 100

The network device according to embodiment 96, wherein the receiver is specifically configured to:
receive a random access preamble sequence sent by the terminal device on a first random access channel, wherein the first random access channel belongs to a first random access channel group, the first random access channel group is used to request a grant-free transmission resource, and the first random access channel group comprises at least one random access channel.

Embodiment 101

The network device according to embodiment 100, wherein the first random access channel is a random access channel of the first random access channel group selected by the terminal device from multiple random access channel groups, wherein the multiple random access channel groups comprise at least the first random access channel group and a second random access channel group, and the second random access channel group is used to request a granted transmission resource.

Embodiment 102

The network device according to embodiment 100 or 101, wherein the first random access channel group comprises N random access channel subgroups, and the N random access channel subgroups are obtained by dividing according to a transmission characteristic.

Embodiment 103

The network device according to embodiment 96, wherein the receiver is specifically configured to:
receive a first random access preamble sequence sent by the terminal device on a first random access channel, wherein a combination of the first random access channel and the first random access preamble sequence belongs to a first combination set, the first combination set is used to request a grant-free transmission resource, and the first combination set comprises at least one combination of a random access channel and a random access preamble sequence.

Embodiment 104

The network device according to embodiment 103, wherein the combination of the first random access channel and the first random access preamble sequence is a combination of a random access channel and a random access preamble sequence in the first combination set that is selected by the terminal device from multiple combination sets, wherein the multiple combination sets comprise at least the first combination set and a second combination set, and the second combination set is used to request a granted transmission resource.

Embodiment 105

The network device according to embodiment 103 or 104, wherein the first combination set comprises K combination subsets, and the K combination subsets are obtained by dividing according to a transmission characteristic.

Embodiment 106

The network device according to any one of embodiment 99, 102, or 105, wherein the transmission characteristic comprises one or more of a latency characteristic, a power consumption characteristic, or a transmission time interval (TTI) length characteristic.

Embodiment 107

The network device according to embodiment 96, wherein the receiver is specifically configured to:
receive resource request information that is used to request the grant-free transmission resource and that is sent by the terminal device to the network device by using radio resource control (RRC) signaling.

Embodiment 108

The network device according to embodiment 96, wherein the receiver is specifically configured to:
receive resource request information that is used to request the grant-free transmission resource and that is sent by the terminal device to the network device by using Media Access Control (MAC) signaling.

Embodiment 109

The network device according to embodiment 107 or 108, wherein the resource request information comprises transmission characteristic information, wherein the transmission characteristic information is used to indicate a transmission characteristic of the grant-free transmission resource of the terminal device.

Embodiment 110

The network device according to embodiment 109, wherein the transmission characteristic information comprises at least one of latency characteristic information, power consumption characteristic information, or transmission time interval (TTI) characteristic information.

111. The network device according to any one of embodiments 107 to 110, wherein the resource request information comprises a terminal device identifier, and the network device further comprises a processor, wherein the processor is configured to:

allocate different grant-free transmission resources to different terminal devices according to the terminal device identifier.

Embodiment 112

The network device according to any one of embodiments 96 to 111, wherein the resource indication information sent by the transmitter comprises one or a combination of time domain location information, frequency domain location information, code domain location information, or pilot information used to indicate the grant-free transmission resource.

Embodiment 113

The network device according to any one of embodiments 96 to 112, wherein the resource indication information sent by the transmitter comprises one or a combination of an index of the grant-free transmission resource, an index of a time domain location of the grant-free transmission resource, an index of a frequency domain location of the grant-free transmission resource, an index of a code domain location of the grant-free transmission resource, or an index of a pilot of the grant-free transmission resource.

Embodiment 114

The network device according to embodiment 112 or 113, wherein the frequency domain location comprises a location of a sub-band occupied by the grant-free transmission resource in a frequency domain.

What is claimed is:

1. An uplink data transmission method, comprising:
    sending, by a terminal device to a network device, information used to request a grant-free transmission resource;
    receiving, by the terminal device, resource indication information sent by the network device, wherein the resource indication information is used to indicate a grant-free transmission resource that is allocated by the network device to the terminal device according to the information used to request the grant-free transmission resource; and
    determining, by the terminal device according to the resource indication information, the transmission resource used for performing grant-free transmission;
    wherein the sending, by the terminal device to the network device, information used to request the grant-free transmission resource comprises:
    sending, by the terminal device, a first random access preamble sequence, to request the grant-free transmission resource from the network device, wherein the first random access preamble sequence belongs to a first random access preamble sequence group, the first random access preamble sequence group is used to request the grant-free transmission resource, and the first random access preamble sequence group comprises at least one random access preamble sequence.

2. The method according to claim 1, wherein before the sending, by the terminal device, a first random access preamble sequence, to request the grant-free transmission resource from the network device, the method further comprises:
    selecting, by the terminal device, the first random access preamble sequence of the first random access preamble sequence group from multiple random access preamble sequence groups, wherein the multiple random access preamble sequence groups comprise at least the first random access preamble sequence group and a second random access preamble sequence group, and the second random access preamble sequence group is used to request a granted transmission resource.

3. The method according to claim 1, wherein the first random access preamble sequence group comprises M first random access preamble sequence subgroups, and the M first random access preamble sequence subgroups are obtained by dividing according to a transmission characteristic.

4. The method according to claim 1, wherein the resource indication information comprises one or a combination of time domain location information, frequency domain location information, code domain location information, or pilot information used to indicate the grant-free transmission resource.

5. The method according to claim 1, wherein the resource indication information comprises one or a combination of an index of the grant-free transmission resource, an index of a time domain location of the grant-free transmission resource, an index of a frequency domain location of the grant-free transmission resource, an index of a code domain location of the grant-free transmission resource, or an index of a pilot of the grant-free transmission resource.

6. The method according to claim 4, wherein the frequency domain location comprises a location of a sub-band occupied by the grant-free transmission resource in a frequency domain.

7. An uplink data transmission method, comprising:
    receiving, by a network device, information that is used to request a grant-free transmission resource and that is sent by a terminal device; and
    sending, by the network device, resource indication information to the terminal device, wherein the resource indication information is used to indicate a grant-free transmission resource that is allocated by the network device to the terminal device according to the information used to request the grant-free transmission resource;
    wherein the receiving, by the network device, information that is used to request the grant-free transmission resource and that is sent by the terminal device comprises:
    receiving, by the network device, a first random access preamble sequence sent by the terminal device, wherein the first random access preamble sequence belongs to a first random access preamble sequence group, the first random access preamble sequence group is used to request the grant-free transmission resource, and the first random access preamble sequence group comprises at least one random access preamble sequence.

8. The method according to claim 7, wherein the resource indication information comprises one or a combination of time domain location information, frequency domain location information, code domain location information, or pilot information used to indicate the grant-free transmission resource.

9. A terminal device, wherein the terminal device comprises a processor, a memory, a transmitter, and a receiver, wherein
the transmitter invokes a program stored in the memory, so as to send, to a network device, information used to request a grant-free transmission resource; the receiver invokes a program stored in the memory, so as to receive resource indication information sent by the network device, wherein the resource indication information is used to indicate a grant-free transmission resource that is allocated by the network device to the terminal device according to the information that is used to request the grant-free transmission resource and that is sent by the transmitter; and the processor invokes a program stored in the memory, so as to determine, according to the resource indication information received by the receiver, the transmission resource used for performing grant-free transmission;
wherein the transmitter is specifically configured to:
send a first random access preamble sequence, to request the grant-free transmission resource from the network device, wherein the first random access preamble sequence belongs to a first random access preamble sequence group, the first random access preamble sequence group is used to request the grant-free transmission resource, and the first random access preamble sequence group comprises at least one random access preamble sequence.

10. The terminal device according to claim 9, wherein the processor is further configured to:
before the transmitter sends the first random access preamble sequence, to request the grant-free transmission resource from the network device, select the first random access preamble sequence of the first random access preamble sequence group from multiple random access preamble sequence groups, wherein the multiple random access preamble sequence groups comprise at least the first random access preamble sequence group and a second random access preamble sequence group, and the second random access preamble sequence group is used to request a granted transmission resource.

11. The terminal device according to claim 9, wherein the first random access preamble sequence group comprises M first random access preamble sequence subgroups, and the M first random access preamble sequence subgroups are obtained by dividing according to a transmission characteristic.

12. The terminal device according to claim 9, wherein the resource indication information received by the receiver comprises one or a combination of time domain location information, frequency domain location information, code domain location information, or pilot information used to indicate the grant-free transmission resource.

13. The terminal device according to claim 9, wherein the resource indication information received by the receiver comprises one or a combination of an index of the grant-free transmission resource, an index of a time domain location of the grant-free transmission resource, an index of a frequency domain location of the grant-free transmission resource, an index of a code domain location of the grant-free transmission resource, or an index of a pilot of the grant-free transmission resource.

14. The terminal device according to claim 9, wherein the frequency domain location comprises a location of a sub-band occupied by the grant-free transmission resource in a frequency domain.

15. A network device, wherein the network device comprises a transmitter and a receiver, wherein
the receiver is configured to receive information that is used to request a grant-free transmission resource and that is sent by a terminal device; the transmitter is configured to send resource indication information to the terminal device, wherein the resource indication information is used to indicate a grant-free transmission resource that is allocated by the network device to the terminal device according to the information that is used to request the grant-free transmission resource and that is received by the receiver;
wherein the receiver is specifically configured to:
receive a first random access preamble sequence sent by the terminal device, wherein the first random access preamble sequence belongs to a first random access preamble sequence group, the first random access preamble sequence group is used to request the grant-free transmission resource, and the first random access preamble sequence group comprises at least one random access preamble sequence.

16. The network device according to claim 15, wherein the resource indication information sent by the transmitter comprises one or a combination of time domain location information, frequency domain location information, code domain location information, or pilot information used to indicate the grant-free transmission resource.

* * * * *